US009212276B2

(12) United States Patent
Tanaka et al.

(10) Patent No.: US 9,212,276 B2
(45) Date of Patent: Dec. 15, 2015

(54) MODIFIED CONJUGATED DIENE RUBBER, METHOD FOR PRODUCING SAME, AND RUBBER COMPOSITION

(75) Inventors: Ryouji Tanaka, Tokyo (JP); Masahiro Shibata, Tokyo (JP); Takaomi Matsumoto, Tokyo (JP); Kenji Hasegawa, Tokyo (JP); Toshihiro Tadaki, Tokyo (JP)

(73) Assignee: JSR CORPORATION, Tokyo (JP)

( * ) Notice: Subject to any disclaimer, the term of this patent is extended or adjusted under 35 U.S.C. 154(b) by 81 days.

(21) Appl. No.: 13/702,809

(22) PCT Filed: May 24, 2011

(86) PCT No.: PCT/JP2011/061894
§ 371 (c)(1),
(2), (4) Date: Dec. 7, 2012

(87) PCT Pub. No.: WO2011/155326
PCT Pub. Date: Dec. 15, 2011

(65) Prior Publication Data
US 2013/0085228 A1   Apr. 4, 2013

(30) Foreign Application Priority Data
Jun. 8, 2010   (JP) .................................. 2010-130931

(51) Int. Cl.
| C08C 19/22 | (2006.01) |
| C08C 19/24 | (2006.01) |
| C08C 19/25 | (2006.01) |
| C08K 5/544 | (2006.01) |
| C08L 9/06 | (2006.01) |
| C08K 5/5415 | (2006.01) |
| C08L 9/00 | (2006.01) |
| C08C 19/44 | (2006.01) |
| C08K 3/04 | (2006.01) |
| C08K 3/36 | (2006.01) |
| B60C 1/00 | (2006.01) |
| C08K 5/00 | (2006.01) |
| C08K 5/057 | (2006.01) |
| C08K 5/548 | (2006.01) |

(52) U.S. Cl.
CPC ... *C08L 9/06* (2013.01); *B60C 1/00* (2013.01); *C08C 19/22* (2013.01); *C08C 19/25* (2013.01); *C08C 19/44* (2013.01); *C08K 3/04* (2013.01); *C08K 3/36* (2013.01); *C08K 5/5415* (2013.01); *C08L 9/00* (2013.01); *C08C 19/24* (2013.01); *C08K 5/0091* (2013.01); *C08K 5/057* (2013.01); *C08K 5/544* (2013.01); *C08K 5/548* (2013.01)

(58) Field of Classification Search
CPC ........ C08C 19/22; C08C 19/24; C08C 19/25; C08C 19/44; C08K 5/544; C08K 5/548; C08K 5/5415; C08K 5/057; C08L 9/00; C08L 9/06; B60C 1/00
USPC ............ 525/331.9, 332.9, 342, 379, 374, 375
See application file for complete search history.

(56) References Cited

U.S. PATENT DOCUMENTS

| 7,288,594 B2 | 10/2007 | Ozawa et al. | |
| 2005/0070672 A1* | 3/2005 | Ozawa et al. ............. | 525/331.9 |
| 2011/0015302 A1 | 1/2011 | Tanaka et al. | |
| 2012/0270997 A1* | 10/2012 | Tanaka et al. ............. | 524/572 |

FOREIGN PATENT DOCUMENTS

| CN | 102574932 A | 7/2012 |
| EP | 2 098 554 A1 | 9/2009 |
| JP | 2008-1742 | 1/2008 |
| JP | 2009-120758 | 6/2009 |
| JP | 2009-173838 | 8/2009 |
| JP | 2009 287020 | 12/2009 |
| JP | 2010 189613 | 8/2010 |
| WO | WO 2008/004675 A1 | 1/2008 |
| WO | 2010 104149 | 9/2010 |
| WO | 2011 049180 | 4/2011 |
| WO | WO 2011/049180 A1 * | 4/2011 |

OTHER PUBLICATIONS

International Serch Report Issued Aug. 23, 2011 in PCT/JP11/061894 Filed May 24, 2011.
Combined Office Action and Search Report issued Jan. 27, 2014 in Chinese Application No. 201180027967.3 (With English Translation).
The Extended European Search Report issued Jul. 4, 2014, in Application No. / Pat. No. 11792283.1-1302 / 2581391.
Office Action issued Apr. 1, 2015 in Japanese Patent Application No. 2012-519332 (with English language translation).

* cited by examiner

*Primary Examiner* — Roberto Rabago
(74) *Attorney, Agent, or Firm* — Oblon, McClelland, Maier & Neustadt, L.L.P.

(57) ABSTRACT

By a method comprising a process including (a) producing a modified conjugated diene polymer through reaction of a conjugated diene polymer having an alkali metal or alkaline-earth metal active terminal with a first alkoxysilane compound which has both an alkoxysilyl group and at least one group convertible into an onium, and (b) mixing the modified conjugated diene polymer, an agent for producing onium, a second alkoxysilane compound having an alkoxysilyl group and at least one group convertible into an onium and a condensation catalyst containing metal element(s) for alkoxysilane compounds, conjugated diene rubber usable as a starting material of cross-linked rubber which is used for a tire tread or the like and allows enhancement of low fuel consumption property can be obtained.

15 Claims, No Drawings

MODIFIED CONJUGATED DIENE RUBBER, METHOD FOR PRODUCING SAME, AND RUBBER COMPOSITION

TECHNICAL FIELD

The present invention relates to a method for producing modified conjugated diene rubber, modified conjugated diene rubber, and a rubber composition. More specifically, the present invention relates to a method for producing modified conjugated diene rubber which allows production of cross-linked rubber having excellent tensile strength, abrasion resistance, wet skid resistance and low hysteresis-loss property, modified conjugated diene rubber which is produced by such a method and has an excellent shape-retaining property, a rubber composition containing such modified conjugated diene rubber, and a cross-linked rubber composition (a vulcanized rubber composition) prepared by cross-linking (e.g. vulcanizing) the rubber composition.

BACKGROUND ART

Conjugated diene rubber (e.g. a styrene-butadiene copolymer) produced by a method of emulsion polymerization has been known as rubber used for car's tires. Under recent circumstances where improvements in low fuel consumption propoerty of cars have been expected, various types of conjugated diene rubber capable of achieving excellent low fuel consumption propoerty have been proposed.

As an example of such rubber, conjugated diolefin (co)polymer rubber has been proposed (Patent Document 1) which (1) is (co)polymer rubber of conjugated diolefin(s) or copolymer rubber of a conjugated diolefin and an aromatic vinyl compound and (2) has primary amino groups and alkoxysilyl groups binding to its (co)polymeric chain, and wherein (3) monomers having bifunctionality or more are copolymerized in its (co)polymeric chain and/or a coupling agent having bifunctionality or more is coupled to at least part of its (co)polymeric chain.

As other example of such rubber, modified diene polymer rubber has been proposed (Patent Document 2) which is produced in a process including a step 1 at which an active polymer with an alkali metal terminal is produced by polymerization of a conjugated diene monomer or polymerization of a conjugated diene monomer with an aromatic vinyl monomer in a hydrocarbon solvent in the presence of an alkali metal catalyst and a step 2 at which modified polymer rubber is produced by reaction between the active polymer and a compound represented by a specific formula.

In addition, as a method of producing a modified polymer capable of obtaining improvements in fracture characteristics, abrasion resistance and low-exothermic properties through increases in interactions with silica and carbon black, there is a proposed method (Patent Document 3) wherein a primary modification reaction is performed by making a polymer having an organometallic active site in its molecule react with a hydrocarbyloxysilane compound at the active site, and then a secondary modification reaction is performed by subjecting the hydrocarbyloxysilane compound to a reaction via condensation reaction between hydrocarbyloxysilyl groups.

Further, as a method of producing a modified conjugated diene polymer for solution of problems which are likely to arise in low-exothermic rubber compositions (such as problems of being low in Mooney viscosity and inferior in shape stability), a method of producing a modified conjugated diene polymer has been proposed (Patent Document 4) which includes a process step (a) wherein a primarily modified polymer is produced by using a conjugated diene polymer having an alkali metal active terminal obtained by anionic polymerization of at least a diene monomer in the presence of an alkali metal initiator in a hydrocarbon solvent and a process step (b) wherein a secondarily modified polymer (modified conjugated diene polymer) is produced through a step (b1) wherein the primarily modified polymer produced is made to react with a condensation accelerator containing metal element(s) and a step (b2) wherein at least one compound chosen from among inorganic acids or metal halides, respectively.

RELATED ART DOCUMENTS

Patent Documents

Patent Document 1: JP-A-2004-18795
Patent Document 2: JP-A-2005-290355
Patent Document 3: WO 03/048216 A1
Patent Document 4: WO 2008/123163 A1

SUMMARY OF THE INVENTION

Problem that the Invention is to Solve

Although various types of conjugated diene rubber capable of achieving low fuel consumption of cars have been proposed as mentioned above, further increase in gas mileage of cars is still hoped under financial circumstances, such as a steep rise in gasoline prices, and environmental circumstances including carbon dioxide emissions. Therefore, the object of the present invention is to provide a method for producing modified conjugated diene rubber which is usable as a starting material of cross-linked rubber which can be used in car's tires and the like and enhancing low fuel consumption property of cars and the like.

Means for Solving the Problem

As a result of extensive studies to solve the foregoing problem, the inventors of the present invention have found that the use of two specific alkoxysilane compounds, an agent for producing onium and a condensation catalyst in addition to a conjugated diene polymer having an alkali or alkaline-earth metal active terminal can impart physical properties including a property of being excellent in low hysteresis loss. As a result, it was made possible to produce modified conjugated diene rubber capable of imparting low fuel consumption property when the rubber is used for car's tires or the like to accomplish the present invention.

More specifically, the present invention provides the following [1] to [13].

[1] A method of producing modified conjugated diene rubber, comprising a step of mixing a modified conjugated diene polymer having a group convertible into an onium and an alkoxysilyl group, an agent for producing onium, a second alkoxysilane compound having an alkoxysilyl group and at least one group which is convertible into an onium by means of the agent for producing onium per molecule group, and a condensation catalyst containing metal element(s) for alkoxysilane compounds.

[2] The method of producing modified conjugated diene rubber according to [1], wherein the modified conjugated diene polymer having a group convertible into an onium and an alkoxysilyl group is a polymer produced by subjecting a conjugated diene polymer having an alkali metal or alkaline-earth metal active terminal wherein the conjugated diene polymer is a polymer produced through polymerization of a conjugated diene compound or polymerization of a conjugated diene compound with an aromatic vinyl compound to reaction with a first alkoxysilane compound having both of an alkoxysilyl group with two or more alkoxy groups and at least one group which is convertible into an onium by means of the agent for producing onium per molecule.

[3] The method of producing modified conjugated diene rubber according to [1] or [2], wherein the group convertible into an onium in the first alkoxysilane compound is at least one group selected from the group consisting of a nitrogen-containing group formed by substituting two protective groups for two hydrogen atoms of a primary amine, a nitrogen-containing group formed by substituting one protective group for one hydrogen atom of a secondary amine, a tertiary amino group, an imino group, a pyridyl group, a phosphorus-containing group formed by substituting two protective groups for two hydrogen atoms of a primary phosphine, a phosphorus-containing group formed by substituting one protective group for one hydrogen atom of a secondary phosphine, a tertiary phosphino group and a sulfur-containing group formed by substituting one protective group for one hydrogen atom of a thiol.

[4] The method of producing modified conjugated diene rubber according to any one of [1] to [3], wherein the agent for producing onium is at least one compound selected from the group consisting of a silicon halide compound, a tin halide compound, an aluminum halide compound, a titanium halide compound, zirconium halide compound, a germanium halide compound, a gallium halide compound, a zinc halide compound, a sulfuric ester, a phosphoric ester, a carboxylic acid and a sulfonic acid.

[5] The method of producing modified conjugated diene rubber according to any one of [1] to [4], wherein the group convertible into an onium in the second alkoxysilane compound is at least one group selected from the group consisting of a primary amino group, a secondary amino group, a tertiary amino group, an imino group, a pyridyl group, a primary phosphino group, a secondary phosphino group, a tertiary phosphino group and a thiol group.

[6] The method of producing modified conjugated diene rubber according to any one of [1] to [5], wherein the condensation catalyst containing metal element(s) for alkoxysilane compounds is a metallic compound containing at least one metal element selected from among metal elements included in the group 4, the group 12, the group 13, the group 14 and the group 15 of the periodic table.

[7] The method of producing modified conjugated diene rubber according to [6], wherein an alkoxide, carboxylate or acetylacetonate complex salt of the metal element(s) is used as the metallic compound.

[8] The method of producing modified conjugated diene rubber according to any one of [1] to [7], further comprising a step of bringing the mixture prepared at the step described in [1] into contact with water.

[9] The method of producing modified conjugated diene rubber according to any one of [1] to [8], wherein the modified conjugated diene rubber contains six kinds of substances which are the modified conjugated diene polymer, the second alkoxysilane compound, a hydrolytic condensation product of the modified conjugated diene polymer and the second alkoxysilane compound, a hydrolytic condensation product of the modified conjugated diene polymer and the condensation catalyst, a hydrolytic condensation product of the second alkoxysilane compound and the condensation catalyst and a hydrolytic condensation product of the modified conjugated diene polymer, the second alkoxysilane compound and the condensation catalyst, and the modified conjugated diene rubber has onium structures formed from the six kinds of substances.

[10] Modified conjugated diene rubber produced by means of the method of producing modified conjugated diene rubber as described in any one of [1] to [9].

[11] A rubber composition comprising the modified conjugated diene rubber described in [10], silica and/or carbon black, and a cross-linking agent.

[12] A cross-linked rubber composition prepared by cross-linking the rubber composition described in [11].

[13] A tire comprising the cross-linked rubber composition described in [12].

Effect of Invention

In accordance with the production method in the present invention, modified conjugated diene rubber having an excellent shape-retaining property can be produced which allows preparation of a cross-linked rubber composition having excellent tensile strength, abrasion resistance, wet skid resistance and low hysteresis-loss property.

The cross-linked rubber composition prepared from the modified conjugated diene rubber which can be used in car's tires and the like and can enhance low fuel consumption property of cars and the like.

Mode for Carrying out the Invention

The method for producing modified conjugated diene rubber in the present invention includes a step (a) wherein a conjugated diene polymer which has an alkali metal or alkaline-earth metal active terminal produced through polymerization of a conjugated diene compound or a conjugated diene compound with an aromatic vinyl compound is made to react with a first alkoxysilane compound having both of an alkoxysilyl group with two or more alkoxy groups and at least one group convertible into an onium by means of an agent for producing onium per molecule to form a modified conjugated diene polymer having the group convertible into an onium and the alkoxysilyl group, and a step (b) wherein the modified conjugated diene polymer formed at the step (a) is mixed with an agent for producing onium, a second alkoxysilane compound having an alkoxysilyl group and at least one group convertible into an onium by means of the agent producing onium per molecule, and a condensation catalyst containing metal element(s) for alkoxysilane compounds.

[1] Method for Producing Modified Conjugated Diene Rubber:

[Step (a)]

The step (a) is a step wherein a conjugated diene polymer which has an alkali metal or alkaline-earth metal active terminal produced through polymerization of a conjugated diene compound or a conjugated diene compound with an aromatic vinyl compound is made to react with a first alkoxysilane compound which contains both of an alkoxysilyl group with two or more alkoxy groups and at least one group convertible into an onium by means of an agent for producing onium per molecule to form a modified conjugated diene polymer having the group convertible into an onium and the alkoxysilyl group.

As an example of the conjugated diene polymer having an alkali metal or alkaline-earth metal active terminal, mention can be made of an anionic polymer produced through the polymerization of a conjugated diene compound alone or the copolymerization of a conjugated diene compound with an aromatic vinyl compound.

As mentioned above, the method for producing the conjugated diene polymer has no particular limitation except for performance of anionic polymerization by an alkali metal or an alkaline-earth metal (hereafter referred to as a polymerization initiator in some cases). For example, as the method for polymerization, any of methods, including a solution polymerization method, a vapor-phase polymerization method and a bulk polymerization method, can be used. Particulerly, a solution polymerization method is preferably used. Additionally, the manner of polymerization may be either a batch style or a continuous style. The metal occupying the active site present in molecule of the conjugated diene polymer is an alkali metal or an alkaline-earth metal. As such a metal, lithium, sodium, potassium, magnesium or barium is preferable, and lithium metal in particularly is preferable. Any of these alkali metal and alkaline-earth metals has similar activity in terms of allowing production of a conjugated diene polymer having a metal active terminal capable of reacting with the first alkoxysilane compound, and even if some of those metals are not mentioned in Examples described later, they can be used in the present invention.

Furthermore, it is also effective to incorporate monomers having functional groups and activate the functional groups in the polymer by the use of an alkali metal initiator. For instance, it is effective that functional group portions of a copolymer containing isobutylene units, para-methylstyrene units and para-halomethylstyrene units are converted into active sites by subjecting them to lithiation.

Examples of the above conjugated diene monomer which can be used suitably include 1,3-butadiene, isoprene, 2,3-dimethyl-1,3-butadine, 1,3-pentadiene, 1,3-hexadiene, 1,3-heptadiene, 2,3-dimethylbutadiene, 2-phenyl-1,3-butadiene, 3-methyl-1,3-pentadiene, 1,3-hexadiene and 2-chloro-1,3-butadine and the like. These diene compounds may be used alone, or any two or more of them may be used in combination. Of those compounds, especially suitable ones are 1,3-butadine, isoprene, 2,3-dimethyl-1,3-butadiene and the like. Any of the conjugated diene monomers has similar activity in terms of allowing production of a conjugated diene polymer having a metal active terminal capable of reacting with the first alkoxysilane compound. Even if some of those monomers are not mentioned in Examples described later, they can be used in the present invention.

Examples of an organic vinyl compound which can be used suitably include styrene, 2-methylstyrene, 3-methylstyrene, 4-methylstyrene, α-methylstyrene, 2,4-dimethylstyrene, 2,4-diisopropylstyrene, 4-tert-butylstyrene, 5-t-butyl-2-methylstyrene, vinylethylbenzene, divinylbenzene, trivinylbenzene, divinylnaphthalene, tert-butoxystyrene, vinylbenzyldimethylamine, (4-vinylbenzyl)dimethylaminoethyl ether, N,N-dimethylaminomethylstyrene, N,N-dimethylaminoethylstyrene, 2-ethylstyrene, 3-ethylstyrene, 4-ethylstyrene, 2-t-butylstyrene, 3-t-butylstyrene, 4-t-butylstyrene, vinylxylene, vinylnaphthalene, vinyltoluene, vinylpyridine, diphenylethylene, and diphenylethylene containing a tertiary amino group and the like. These compounds may be used alone, or any two or more of them may be used in combination. Among such compounds, styrene is particularly suitable. Any of the aromatic vinyl compounds has similar activity in terms of allowing production of a conjugated diene polymer having a metal active terminal capable of reacting with the first alkoxysilane compound. Even if some of those compounds are not mentioned in Examples described later, they can be used in the present invention.

Furthermore, when copolymerization is carried out using a conjugated diene monomer and an aromatic vinyl compound, it is preferable that 1,3-butadiene and styrene are used, respectively. The monomers are not only available with ease but also superior in point of having high living capability in anionic polymerization. Additionally, when a solution polymerization method is used, the suitable monomer concentration in a solvent is preferably from 5 to 50 mass %, more preferably from 10 to 30 mass %, in terms of maintenance of a balance between productivity and easiness of polymerization control. In this connection, in the case of carrying out copolymerization by using a conjugated diene monomer and an aromatic vinyl compound, the suitable aromatic vinyl compound content of a monomer mixture prepared is preferably from 3 to 55 mass %, more preferably from 5 to 50 mass %, in terms of maintenance of a balance between a low hysteresis-loss property and wet skid resistance of a cross-linked rubber composition to be produced.

Examples of a compound which is usd as a polymerization initiator derived from an alkali metal or an alkaline-earth metal include alkyl lithium, alkylene dilithium, lithium alkyleneimide, lithium dialkylamide, phenyl lithium, stilbene lithium, lithium naphthalene, sodium naphthalene, potassium naphthalene, n-butyl magnesium, n-hexyl magnesium, calcium ethoxide, calcium stearate, strontium t-butoxide, barium ethoxide, barium isopropoxide, ethylmercaptobarium, barium t-butoxide, barium phenoxide, diethylaminobarium, barium stearate, ketyl barium, biphenyl sodium, potassium-tetrahydrofuran complex, potassium-diethoxyethane complex, and sodium salt of α-methylstyrene tetramer. Among these compounds, organolithium compounds including alkyl lithium and the like and lithium amide compounds including lithium alkyleneimide and the like are especially suitable examples. In the case of using an organolithium compound, a conjugated diene polymer having a hydrocarbon group at the polymerization initiation terminal and a polymerization active site at the other terminal is produced. In the case of using a lithium amide compound, on the other hand, a conjugated diene polymer having a nitrogen-containing group at the polymerization initiation terminal and a polymerization active site at the other terminal is produced. As to the polymerization initiators derived from alkali metals or alkaline-earth metals, any of them has similar activity in terms of allowing production of a conjugated diene polymer having a metal active terminal capable of reacting with the first alkoxysilane compound. Even if some of those initiators are not mentioned in Examples described later, they can be used in the present invention.

A the organolithium compound, a lithium compound with a hydrocarbon group containing 1 to 20 carbon atoms is preferable. Examples thereof include methyl lithium, ethyl lithium, n-propyl lithium, isopropyl lithium, n-butyl lithium, sec-butyl lithium, tert-octyl lithium, n-decyl lithium, phenyl lithium, 2-naphthyl lithium, 2-butylphenyl lithium, 4-phenylbutyl lithium, cyclohexyl lithium, a product of reaction between diisopropenylbenzene and butyl lithium, t-butyl lithium, n-hexyl lithium, benzyl lithium, phenyl lithium, stilbene lithium, 1,4-dilithiobutane, 1,3,5-trilithiobenzene, a product of reaction between n-butyl lithium, 1,3-butadiene and divinylbenzene, a product of reaction between n-butyl lithium and a polyacetylene compound, 4-cyclopentyl lithium, 1,2-dilithiomethane, 1,4-dilithiobutane, 1,4-dilithio-2-ethylcylohexane and 1,3,5-trilithiobenzene. Among these compounds, n-butyl lithium and sec-butyl lithium are preferable over the others.

On the other hand, examples of the lithium amide compound include lithium hexamethyleneimide, lithium pyrrolidide, lithium piperidide, lithium heptamethyleneimide, lithium dodecamethyleneimide, lithium morpholide, lithium dimethylamide, lithium diethylamide, lithium dibutylamide, lithium dipropylamide, lithium diisopropylamide, lithium diheptylamide, lithium dihexylamide, lithium dioctylamide, lithium di-2-ethylhexylamide, lithium didecylamide, lithium N-methylpiperazide, lithium ethylpropylamide, lithium ethylbutylamide, lithium ethylbenzylamide, lithium methylphenethylamide, 3-[N,N-bis(trimethylsilyl)]-1-propyl lithium, 3-[N,N-bis(trimethylsilyl)]-2-methyl-1-propyl lithium, 3-[N,N-bis(trimethylsilyl)]-2,2-dimethyl-1-propyl lithium, 4-[N,N-bis(trimethylsilyl)]-1-butyl lithium, 5-[N,N-bis(trimethylsilyl)]-1-pentyl lithium, 8-[N,N-bis(trimethylsilyl)]-1-octyl lithium, 3-(2,2,5,5-tetramethyl-2,5-disila-1-azacyclopentane)-1-propyl lithium, 2-methyl-3-(2,2,5,5-tetramethyl-2,5-disila-1-azacyclopentane)-1-propyl lithium, 2,2-dimethyl-3-(2,2,5,5-tetramethyl-2,5-disila-1-azacyclopentane)-1-propyl lithium, 4-(2,2,5,5-tetramethyl-2,5-disila-1-azacyclopentane)-1-butyl lithium and 6-(2,2,5,5-tetramethyl-2,5-disila-1-azacyclopentane)-1-hexyl lithium. Among the compounds, cyclic lithium amides including lithium hexamethyleneimide, lithium pyrrolidide, lithium piperidide, lithium heptamethyleneimide and lithium dodecamethyleneimide, particularly lithium hexamethyleneimide, lithium pyrrolidide and lithium piperidide, are preferred over the others in terms of their effects of interactions with carbon black and silica and their capabilities of initiating polymerization.

As to the lithium amide compounds, although those prepared in advance from secondary amines and lithium compounds are generally used as polymerization initiators in many cases, it is also possible to prepare them in polymerization systems (in situ). Additionally, it is appropriate that such a polymerization initiator be used in an amount selected from a range of 0.2 to 20 mmols per 100 g of monomer.

Specific example of a method adopted in case of the production of a conjugated diene polymer through anionic polymerization using the above lithium compounds as polymerization initiators include a method of subjecting a diene monomer or both a diene monomer and an aromatic vinyl compound to anionic polymerization in a reaction-inactive organic solvent e.g. a hydrocarbon solvent, such as an aliphatic, alicyclic, aromatic hydrocarbon compound or the like, by using the lithium compound as a polymerization initiator in the presence of a randomizer used as desired. In accordance with such a method, intended conjugated diene polymers can be produced.

As the hydrocarbon solvent, those containing 3 to 8 carbon atoms are suitable. Examples thereof include propane, n-butane, isobutane, n-pentane, isopentane, n-hexane, cyclohexane, propene, 1-butene, isobutene, trans-2-butene, cis-2-butene, 1-pentyne, 2-pentyne, 1-hexene, 2-hexene, benzene, toluene, xylene, ethylbenzene, heptane, cyclopentane, methylcyclopentane, methylcyclohexane, 1-pentene, 2-pentene, cyclohexene and the like. The solvents may be used alone, or any two or more of them may be used in combination.

Additionally, the randomizer used as desired is a compound having the action of controlling the microstructure of a conjugated diene polymer, such as the action of increasing the number of vinyl bonds (1,2-bonding) in the butadiene portions of a butadiene-styrene copolymer or the number of vinyl bonds (1,2-bonding and 3,4-bonding) in an isoprene polymer, or a compound having the action of controlling compositional distribution of monomer units in a conjugated diene polymer, such as the action of randomizing butadiene units and styrene units in a butadiene-styrene copolymer. The randomizer as defined above has no particular limitation, and any of those chosen as appropriate from known compounds currently in use as randomizers can be utilized. Specifically, examples thereof include ethers and tertiary amines, such as dimethoxybenzene, tetrahydrofuran, dimethoxyethane, diethylene glycol dibutyl ether, diethylene glycol dimethyl ether, 2,2-di(tetrahydrofuryl)propane, 2-(2-ethoxyethoxy)-2-methylpropane, triethylamine, pyridine, N-methylmorpholine, N,N,N',N'-tetramethylethylenediamine, 1,2-dipiperidinoethane, ethylene glycol dibutyl ether, ethylene glycol dimethyl ether, diethyl ether, dioxane, trimethylamine, quinacridine, potassium t-amylate, potassium t-butylate, triphenylphosphine, tetrahydropyran, dibutyl ether, ethylene glycol diethyl ether, diethylene glycol diethyl ether, diphenyl ether, anisole, tripropylamine, tributylamine, N,N-diethylaniline and quinoline. These randomizers may be used alone, or any two or more of them may be used in combination.

In the case of intending to enhance reactivity of such a polymerization initiator as described above, or in the case of intending to arrange randomly an aromatic vinyl compound at its introduction into a polymer or incorporate a simple or long chain of aromatic vinyl compounds into a polymer, a potassium compound may be added together with the polymerization initiator. Examples of a potassium compound which can be added together with the polymerization initiator include potassium alkoxides and potassium phenoxides, typified by potassium isoproxide, potassium t-butoxide, potassium t-amyloxide, potassium n-heptaoxide, potassium benzyloxide and potassium phenoxide; potassium salts of isovaleric acid, caprylic acid, lauric acid, palmitic acid, stearic acid, oleic acid, linolenic acid, benzoic acid, phthalic acid, 2-ethylhexanoic acid and the like; potassium salts of organic sulfonic acids, such as dodecylbenzenesulfonic acid, tetradecylbenzenesulfonic acid, hexadecylbenzenesulfonic acid and octadecylbenzenesulfonic acid; and potassium salts of partial esters of organic phosphorous acids, such as diethyl phosphite, diisopropyl phosphite, diphenyl phosphite, dibutyl phosphite and dilauryl phosphite.

Such a potassium compound is preferably added in an amount of 0.005 to 0.5 mole per gram-atomic equivalent weight of the alkali metal or alkaline-earth metal of a polymerization initiator used. When the amount added is smaller than 0.005 mole, addition of the potassium compound sometimes brings no effects (improvement in reactivity of polymerization initiators or randomization or incorporation of a simple or long chain of aromatic vinyl compounds). On the other hand, when the amount added is greater than 0.5 mole, there sometimes occurs not only lowing of polymerization activity, which results in a significant reduction in productivity, but also reduction of modification efficiency in modification reaction with the first alkoxysilane compound.

The suitable temperature of this polymerization reaction is preferably from −20° C. to 150° C. and more preferably from 0° C. to 120° C. Although the polymerization reaction can be carried out under generated pressure, it is appropriate in ordinary cases that operations are performed under pressure high enough to substantially keep the monomer(s) in a liquid phase. More specifically, depending on the individual substances to be polymerized, the medium used in polymerization and the polymerization temperature chosen, higher pressure in comparison with generated pressure can be used if desired. Such pressure can be obtained in an appropriate way, such as pressurization of a reaction vessel with a gas inactive in polymerization reaction.

In the polymerization, all that are used as starting materials participating in the polymerization, including a polymerization initiator, a solvent and a monomer and so on, are preferably those wherein reaction-inhibiting substances, such as water, oxygen, carbon dioxide and protonic compounds have removed. Additionally, in the case of producing a polymer as an elastomer, the glass transition temperature (Tg) of the polymer or copolymer produced is preferably from −90° C. to 0° C. by determination by a differential thermal analysis. It is difficult to produce a polymer having a glass transition temperature lower than −90° C. On the other hand, when the polymer produced has a glass transition temperature higher than 0° C., the viscosity thereof is too high in the region of room temperature by which cases occur in which the handling thereof becomes difficult.

As the alkoxysilyl group in a first alkoxysilane compound, one which has two or more alkoxy groups is used in terms of reactivity with a conjugated diene polymer having an alkali or alkaline-earth metal active terminal. Suitable examples of such alkoxy groups include those having alkyl or aryl moieties having 1 to 20 carbon atoms. In the cases where two or more alkoxy groups are present, each group may be the same as or different from every other group.

In the first alkoxysilane compound, the group convertible into an onium is not only a protective group intended for protection from the alkali or alkaline-earth metal active terminal of a conjugated diene polymer but also have at least one group convertible into an onium by the action of an agent for producing onium per molecule after removal of the protection. Examples thereof include a nitrogen-containing group formed by substituting two protective groups for two hydrogen atoms of a primary amine, a nitrogen-containing group formed by substituting one protective group for one hydrogen atom of a secondary amine, a tertiary amino group, an imino group, a pyridyl group, a phosphorus-containing group formed by substituting two protective groups for two hydrogen atoms of a primary phosphine, a phosphorus-containing group formed by substituting one protective group for one hydrogen atom of a secondary phosphine, a tertiary phosphino group or a sulfur-containing group formed by substituting one protective group for one hydrogen atom of a thiol. These kinds of first alkoxysilane compounds may be used alone, or any two or more kinds thereof may be used in combination.

Examples of a compound having an alkoxysilyl group and a nitrogen-containing group formed by substituting two protective groups for two hydrogen atoms of a primary amine or a nitrogen-containing group formed by substituting one protective group for one hydrogen atom of a secondary amine or a tertiary amino group include N,N-bis(trimethylsilyl)aminopropylmethyldimethoxysilane, N,N-bis(trimethylsilyl)aminopropyltrimethoxysilane, N,N-bis(trimethylsilyl)aminopropyltriethoxysilane, N,N-bis(trimethylsilyl)aminopropylmethyldiethoxysilane, N,N-bis(trimethylsilyl)aminoethyltrimethoxysilane, N,N-bis(trimethylsilyl)aminoethyltriethoxysilane, N,N-bis(trimethylsilyl)aminoethylmethyldimethoxysilane, N,N-bis(trimethylsilyl)aminoethylmethyldiethoxysilane, N,N-bis(triethylsilyl)aminopropylmethyldimethoxysilane, N,N-bis(triethylsilyl)aminopropyltrimethoxysilane, N,N-bis(triethylsilyl)aminopropyltriethoxysilane, N,N-bis(triethylsilyl)aminopropylmethyldiethoxysilane, N,N-bis(triethylsilyl)aminoethyltrimethoxysilane, N,N-bis(triethylsilyl)aminoethyltriethoxysilane, N,N-bis(triethylsilyl)aminoethylmethyldimethoxysilane, N,N-bis(triethylsilyl)aminoethylmethyldiethoxysilane, N,N',N'-tris(trimethylsilyl)-N-(2-aminoethyl)-3-aminopropyltriethoxysilane, N,N',N'-tris(trimethylsilyl)-N-(2-aminoethyl)-3-aminopropylmethyldiethoxysilane, N,N',N'-tris(trimethylsilyl)-N-(2-aminoethyl)-3-aminopropyltrimethoxysilane, N,N',N'-tris(trimethylsilyl)-N-(2-aminoethyl)-3-aminopropylmethyldimethoxysilan, 1-(3-triethoxysilylpropyl)-2,2,5,5-tetramethyl-1-aza-2,5-disilacyclopentane, 1-(3-trimethoxysilylpropyl)-2,2,5,5-tetramethyl-1-aza-2,5-disilacyclopentane, 1-(3-methyldiethoxysilylpropyl)-2,2,5,5-tetramethyl-1-aza-2,5-disilacyclopentane, 1-(3-methyldimethoxysilylpropyl)-2,2,5,5-tetramethyl-1-aza-2,5-disilacyclopentane, 1-trimethylsilyl-2,2-dimethoxy-1-aza-2-silacyclopentane, N-[3-(trimethoxysilyl)-propyl]-N,N'-diethyl-N'-trimethylsilyl-ethane-1,2-diamine, N-[3-(triethoxysilyl)-propyl]-N,N'-diethyl-N'-trimethylsilyl-ethane-1,2-diamine, N-[3-(methyldimethoxysilyl)-propyl]-N,N'-diethyl-N'-trimethylsilyl-ethane-1,2-diamine, N-[3-(methyldimethoxysilyl)-propyl]-N,N'-diethyl-N'-trimethylsilyl-p-phenylenediamine, N-[3-(triethoxysilyl)-propyl]-N,N'-diethyl-N'-trimethylsilyl-p-phenylenediamine, 3-[3-(trimethylsilylethylamino)-1-pyrrolidinyl]-propyl-methyldiethoxysilane, 3-[3-(trimethylsilylpropylamino)-1-pyrrolidinyl]-propyl-triethoxysilane, N-[3-(diethoxymethylsilyl)-propyl]-N-ethyl-N'-(2-ethoxyethyl)-N'-trimethylsilyl-ethane-1,2-diamine, N-[3-tripropoxysilyl)-propyl]-N-propyl-N'42-ethoxyethyl)-N'-triethylsilyl-p-phenylenediamine, N-[24diethoxymethylsilyl)-1-methylethyl]-N-ethyl-N'-(2-diethylamino-ethyl)-N'-triethylsilyl-ethane-1,2-diamine, N-[3 4triethoxysilyl)-propyl]-N-ethyl-N-(2-diethylaminoethyl)-N'-triethylsilyl-ethane-1,2-diamine, 3-(4-methyl-1-piperazino)propylmethyldimethoxysilane, 3-(4-methyl-1-piperazino)propyltriethoxysilane, 3-(4-methyl-1-piperazino)propyltrimethoxysilane, 3-(4-methyl-1-piperazino)propyltributoxysilane, 3-(4-ethyl-1-piperazino)propylmethyldimethoxysilane, 3-(4-ethyl-1-piperazino)propyltriethoxysilane, 3-(4-ethyl-1-piperazino)propyltrimethoxysilane, 3-(4-ethyl-1-piperazino)propyltributoxysilane, 3-(4-trimethylsilyl-1-piperazino)propylmethyldimethoxysilane, 3-(4-trimethylsilyl-1-piperazino)propyltriethoxysilane, 3-(4-trimethylsilyl-1-piperazino)propyltributoxysilane, 3-(4-trimethylsilyl-1-piperazino)propylmethyldiethoxysilane, 3-(4-trimethylsilyl-1-piperazino)propyltrimethoxysilane, 3-(3-trimethylsilyl-1-imidazolidinyl)propylethyldiethoxysilane, 3-(3-trimethylsilyl-1-imidazolidinyl)propyltriethoxysilane, 3-(3-trimethylsilyl-1-hexahydropyrimidinyl)propylmethyldimethoxysilane, 3-(3-trimethylsilyl-1-hexahydropyrimidinyl)propyltriethoxysilane, 4-(4-trimethylsilyl-1-piperazinyl)butyltriethoxysilane, N-[2-(trimethoxysilyl)-ethyl]-N,N',N'-trimethylethane-1,2-diamine, N-[2-(dimethoxymethylsilyl)-ethyl]-N-ethyl-N',N'-dimethylethane-1,2-diamine, N-[3-(trimethoxysilyl)-propyl]-N',N',N'-trimethylpropane-1,3-diamine, N-[3-(dimethoxymethylsilyl)-propyl]-N-ethyl-N',N'-dimethylpropane-1,3-diamine, N-[3-(triethoxysilyl)-propyl]-N,N',N'-triethyl-2-methylpropane-1,3-diamine, N-[3-(dimethoxymethylsilyl)-propyl]-2,N,N',N'-tetramethylpropane-1,3-diamine, N-(2-dimethylaminoethyl)-N'-[2-(trimethoxysilyl)-ethyl]-N,N'-dimethylethane-1,2-diamine, N-[2-(diethoxyprorylsilyl)-ethyl]-N'-(3-ethoxypropyl)-N,N'-dimethylethane-1,2-diamine, N-[2-(trimethoxysilyl)-ethyl]-N'-methoxymethyl-N,N'-dimethylethane-1,2-diamine, N-[2-(trimethoxysilyl)-ethyl]-N,N'-dimethyl-N'-(2-trimethylsilylethyl)-ethane-1,2-diamine, N-[24triethoxysilyl)-ethyl]-N,N'-diethyl-N'-(2-dibutylmethoxysilylethyl)-ethane-1,2-diamine, 1-[3-(triethoxysilyl)-propyl]-4-methylpiperazine, 1-[3-(diethoxyethylsilyl)-propyl]-4-methylpiperazine, 1-[3-(trimethoxysilyl)-propyl]-4-methylpiperazine, 1-[3-(diethoxymethylsilyl)-propyl]-4-methylpiperazine, 1-[3-(dimethoxymethylsilyl)-propyl]-4-methylpiperazine, 1-[3-(trimethoxysilyl)-propyl]-3-methylimidazolidine, 1-[3-(diethoxyethylsilyl)-propyl]-3- ethylimidazolidine, 1-[3-(triethoxysilyl)-propyl]-3-methyl-hexahydropyrimidine, 1-[3-(dimethoxymethylsilye-propyl]-3-methylhexahydropyrimidine, 3-[3-(tributoxysilyl)-propyl]-1-methyl-1,2,3,4-tetrahydropyrimidine, 3-[3-(dimethoxymethylsilyl)-propyl]-1-ethyl-1,2,3,4-tetrahydropyrimidine, 1(2-ethoxyethyl)-3-[3-(trimethoxysilyl)-propyl]-imidazolidine, 2-{3-[3-(trimethoxysilyl)-propyl]-tetrahydropyrimidine-1-yl}-ethyldimethylamine, 2-(trimethoxysilyl)-1,3-dimethylimidazolidine, 24diethoxyethylsilyl)-1,3-diethylimidazolidine, 2-(triethoxysilyl)-1,4-diethylpiperazine, 2-(dimethoxymethylsilyl)-1,4-dimethylpiperazine, 5-(triethoxysilyl)-1,3-dipropylhexahydropyrimidine, 5-(diethoxyethylsilyl)-1,3-diethylhexahydropyrimidine, 2-[3-(2-dimethylaminoethyl)-2-(ethyldimethoxysilyl)-imidazolidine-1-yl]-ethyl-dimethylamine, 5-(trimethoxysilyl)-1,3-bis(2-methoxyethyl)-hexahydropyrimidine, 5-(ethyldimethoxysilanyl)-1,3-bis(trimethylsilanyl)-hexahydropyrimidine, 2-(3-diethoxyethylsilyl-propyl)-1,3-diethylimidazolidine, 2-(3-triethoxysilyl-propyl)-1,4-diethylpiperazine, 2-(3-dimethoxymethylsilyl-propyl)-1,4-dimethylpiperazine, 5-(3-triethoxysilyl-propyl)-1,3-dipropylhexahydropyrimidine, 5-(3-diethoxyethylsilyl-propyl)-1,3-diethylhexahydropyrimidine, 2-[3-(2-dimethylaminoethyl)-2-(3-ethyldimethoxysilyl-propyl)-imidazolidine-1-yl]-ethyl-dimethylamine, 5-(3-trimethoxysilyl-propyl)-1,3-bis(2-methoxyethyl)-hexahydropyrimidine, 5-(3-ethyldimethoxysilyl-propyl)-1,3-bis(2-trimethylsilylethyl)-hexahydropyrimidine, 3-dimethylaminopropyltrimethoxysilane, 3-diethylaminopropyltrimethoxysilane, 3-dimethylaminopropyltriethoxysilane, 3-diethylaminopropyltriethoxysilane, 3-ethylmethylaminopropyltrimethoxysilane, 3-ethylmethylaminopropyltriethoxysilane, 3-dimethylaminopropylmethyldimethoxysilane, 3-diethylaminopropylmethyldiethoxysilane, 3-dimethylaminopropylethyldimethoxysilane, 3-diethylaminopropylethyldimethoxysilane, 3-ethylmethylaminopropylmethyldimethoxysilane, 3-ethylmethylaminopropylethyldimethoxysilane, 3-dimethylaminopropylmethyldiethoxysilane, 3-diethylaminopropylmethyldiethoxysilane, 3-dimethylaminopropylethyldiethoxysilane, 3-diethylaminopropylethyldiethoxysilane, 3-ethylmethylaminopropylmethyldiethoxysilane, 3-ethylmethylaminopropylethyldiethoxysilane, 3-di(methoxymethyl)aminopropyltrimethoxysilane, 3-di(methoxyethyl)aminopropyltrimethoxysilane, 3-di(methoxymethyl)aminopropyltriethoxysilane, 3-di(methoxyethyl)aminopropyltriethoxysilane, 3-di(ethoxyethyl)aminopropyltrimethoxysilane, 3-di(ethoxymethyl)aminopropyltrimethoxysilane, 3-di(ethoxyethyl)aminopropyltriethoxysilane, 3-di(ethoxymethyl)aminopropyltriethoxysilane, 3-di(trimethylsilyl)aminopropyltrimethoxysilane, 3-di(trimethylsilypaminopropyltriethoxysilane, 3-di(t-butyldimethylsilyl)aminopropyltrimethoxysilane, 3-di(t-3-butyldimethylsilyl)aminopropyltriethoxysilane, 3-di(trimethylsilyl)aminopropylmethyldimethoxysilane, 3-di(trimethylsilyl)aminopropylmethyldiethoxysilane, 3-di(t-butyldimethylsilyl)aminopropylmethyldimethoxysilane, 3-di(t-butyldimethylsilyl)aminopropylmethyldiethoxysilane, 3-morpholinopropyltrimethoxysilane, 3-morpholinopropyltriethoxysilane, 3-morpholinopropylmethyldimethoxysilane, 3-morpholinopropylethyldimethoxysilane, 3-morpholinopropylmethyldiethoxysilane, 3-morpholinopropylethyldiethoxysilane, 3-piperidinopropyltrimethoxysilane, piperidinopropyltriethoxysilane, 3-piperidinopropylmethyldimethoxysilane, 3-piperidinopropylethyldimethoxysilane, 3-piperidinopropylmethyldiethoxysilane, 3-piperidinopropylethyldiethoxysilane, bis[3-(triethoxysilyl)propyl]trimethylsilylamine, bis[3-(trimethoxysilyl)propyl]trimethylsilylamine, and compounds each having an ethanolamine structure or the like and an alkoxysilyl group. N,N-bis(triethylsilyl)aminopropylmethyldimethoxysilane, N,N-bis(trimethylsilyl)aminopropylmethyldimethoxysilane, N,N-bis(trimethylsilyl)aminopropylmethyldiethoxysilane, N,N-bis(trimethylsilyl)aminopropyltriethoxysilane, 1-(3-triethoxysilylpropyl)-2,2,5,5-tetramethyl-1-aza-2,5-disilacyclopentane, N,N',N'-tris(trimethylsilyl)-N-(2-aminoethyl)-3-3-aminopropyltriethoxysilane, 1-trimethylsilyl-2,2-dimethoxy-1-aza-2-silacyclopentane, N-[3-(trimethoxysilyl)-propyl]-N,N'-diethyl-N'-trimethylsilyl-ethane-1,2-diamine, N-[3-(triethoxysilyl)-propyl]-N,N'-diethyl-N'-trimethylsilyl-ethane-1,2-diamine, 3-(4-trimethylsilyl-1-piperazino)propyltriethoxysilane, N-[2-(trimethoxysilyl)-ethyl]-N,N',N'-trimethylethane-1,2-diamine, 1-[3-(triethoxysilyl)-propyl]-4-methylpiperazine, 2-(trimethoxysilyl)-1,3-dimethylimidazolidine, 2-(3-trimethoxysilyl-propyl)-1,3-dimethylimidazolidine, 3-dimethylaminopropyltrimethoxysilane, 3-diethylaminopropyltrimethoxysilane, 3-dimethylaminopropyltriethoxysilane, 3-diethylaminopropyltriethoxysilane, bis [3-(triethoxysilyl)propyl]trimethylsilylamine, bis [3-(trimethoxysilyl)propyl]trimethylsilylamine and the like are preferable.

Examples of a compound having an aloxysilyl group and an imino group or a pyridyl group include N-(1,3-dimethylbutylidene)-3-(triethoxysilyl)-1-propaneamine, N-(1,3-methylethylidene)-3-(triethoxysilyl)-1-propaneamine, N-ethylidene-3-(triethoxysilyl)-1-propaneamine, N-(1-methylpropylidene)-3-(triethoxysilyl)-1-propaneamine, N-(4-N,N-dimethylaminobenzylidene)-3-(triethoxysilyl)-1-propaneamine, N-(cyclohexylidene)-3-(triethoxysilyl)-1-propaneamine, the trimethoxysilyl compounds; the methyldiethoxysilyl compounds; and the ethyldimethoxysilyl compounds corresponding to the triethoxysilyl compounds recited above, N-(3-trimethoxysilylpropyl)-4,5-dihydroimidazole, N-(3-triethoxysilylpropyl)-4,5-dihydroimidazole, N-(3-trimethoxysilylpropyl)-4,5-imidazole, N-(3-triethoxysilylpropyl)-4,5-imidazole, 3-hexamethyleneiminopropyltrimethoxysilane, 3-hexamethyleneiminopropyltriethoxysilane, 3-hexamethyleneiminopropylmethyldimethoxysilane, 3-hexamethyleneiminopropylethyldimethoxysilane, 3-hexamethyleneiminopropylmethyldiethoxysilane, 3-hexamethyleneiminopropylethyldiethoxysilane, and compounds each having structures of an alkoxysilyl group and a benzimidazole, melamine, amidine or like. In this connection, N-(1,3-dimethylbutylidene)-3-(triethoxysilyl)-1-propaneamine, N-(1-methylpropylidene)-3-(triethoxysilyl)-1-propaneamide, N-(3-trimethoxysilylpropyl)-4,5-dihydroimidazole, N-(3-triethoxysilylpropyl)-4,5-dihydroimidazole, N-(3-trimethoxysilylpropyl)-4,5-imidazole and N-(3-triethoxysilylpropyl)-4,5-imidazole are preferable.

Examples of a compound having an alkoxysilyl group and a phosphorus-containing group formed by substituting two protective groups for two hydrogen atoms of a primary phosphine, a phosphorus-containing group formed by substituting one protective group for one hydrogen atom of a secondary phosphine, a tertiary phosphino group or a sulfur-containing group formed by substituting one protective group for one hydrogen atom of a thiol include P,P-bis(trimethylsilyl)phosphinopropylmethyldimethoxysilane, P,P-bis(trimethylsilyl)phosphinopropyltrimethoxysilane, P,P-bis(trimethylsilyl)phosphinopropyltriethoxysilane, P,P-bis(trimethylsilyl)phosphinopropylmethyldiethoxysilane, P,P-bis(trimethylsilyl)phosphinoethyltrimethoxysilane, P,P-bis(trimethylsilyl)phosphinoethyltriethoxysilane, P,P-bis(trimethylsilyl)phosphinoethylmethyldimethoxysilane, bis(trimethylsilyl)phosphinoethylmethyldiethoxysilane, 3-dimethylphosphinopropyltrimethoxysilane, 3-diethylphosphinopropyltrimethoxysilane, 3-dimethylphosphinopropyltriethoxysilane, 3-diethylphosphinopropyltriethoxysilane, 3-ethylmethylphosphinopropyltrimethoxysilane, 3-ethylmethylphosphinopropyltriethoxysilane, 3-dimethylphosphinopropylmethyldimethoxysilane, 3-diethylphosphinopropylmethyldimethoxysilane, 3-dimethylphosphinopropylethyldimethoxysilane, 3-diethylphosphinopropylethyldimethoxysilane, 3-ethylmethylphosphinopropylmethyldimethoxysilane, 3-ethylmethylphosphinopropylethyldimethoxysilane, 3-dimethylphosphinopropylmethyldiethoxysilane, 3-diethylphosphinopropylmethyldiethoxysilane, 3-dimethylphosphinopropylethyldiethoxysilane, 3-diethylphosphinopropylethyldiethoxysilane, 3-ethylmethylphosphinopropylmethyldiethoxysilane, 3-ethylmethylphosphinopropylethyldiethoxysilane, 3-diphenylphosphinopropyltrimethoxysilane, 3-diphenylphosphinopropyltriethoxysilane, 3-diphenylphosphinopropylmeryldimethoxysilane, diphenylphosphinopropylmeryldiethoxysilane, S-trimethylsilylmercaptopropylmethyldimethoxysilane, S-trimethylsilylmercaptopropyltrimethoxysilane, S-trimethylsilylmercaptopropyltriethoxysilane, S-trimethylsilylmercaptopropylmethyldiethoxysilane, S-trimethylsilylmercaptoethyltrimethoxysilane, S-trimethylsilylmercaptoethyltriethoxysilane, S-trimethylsilylmercaptoethylmethyldimethoxysilane, S-trimethylsilylmercaptoethylmethyldiethoxysilane and the like. In this connection, 3-diphenylphosphinopropyltrimethoxysilane, 3-diphenylphosphinopropyltriethoxysilane, S-trimethylsilylmercaptopropylmethyldimethoxysilane, S-trimethylsilylmercaptopropyltrimethoxysilane, S-trimethylsilylmercaptopropyltriethoxysilane and S-trimethylsilylmercaptomethyldiethoxysilane are preferable.

By subjecting the conjugated diene polymer having an alkali metal or alkaline-earth metal active terminal to reaction with a first alkoxysilane compound, the site of the alkali metal or alkaline-earth metal active terminal is made to combine with one site of the two or more alkoxy groups, by which a modified conjugated diene polymer having the group convertible into an onium and the residual alkoxysilyl group can be obtained. Additionally, the first alkoxysilane compounds recited above can react with conjugated diene polymers having an alkali metal or alkaline-earth metal active terminal. Additionally, even if some of the compounds are not mentioned in Examples described later, they can be used in the present invention from the viewpoints of reacting or interacting with carbon black and/or silica acting as a reinforcing agent when they are made into rubber compositions and imparting a property of being excellent in low hysteresis loss when they are made into cross-linked rubber compositions.

Modification reaction for introducing those first alkoxysilane compounds into the alkali metal or alkaline-earth metal active terminals of conjugated diene polymers can be performed e.g. in solution reaction (wherein the solution used may be a solution containing monomers which remain unreacted at polymerization time). The modification reaction has no particular limitation as to its form, and it may be carried out by using a batch-type reactor or it may be carried out in a continuous mode by using an instrument such as a multistage continuous reactor or an in-line mixer. Additionally, it is preferable that the modification reaction is performed in advance of various operations required for solvent removal treatment, water treatment, heat treatment and isolation of the polymer after completion of polymerization reaction.

As to the amount of a first alkoxysilane compound used in the modification reaction, it is preferable that the first alkoxysilane compound is added in an amount of at least 0.1 mole-equivalent weight and it is more preferable that the first alkoxysilane compound is added at least 0.3 mole-equivalent weight, with respect to the active site of the conjugated diene polymer produced by anionic polymerization. When the added amount is less than 0.1 mole-equivalent weight, the progress of modification reaction is not adequate, and the ability to disperse a reinforcing agent cannot be improved to a sufficient degree. As a result, when the modification reaction product is made into a cross-linked rubber composition, cases sometimes occur in which the composition made is inferior in tensile strength, abrasion resistance, wet skid resistance and low hysteresis-loss property.

Additionally, the method for adding the first alkoxysilane compound as a modifier has no particular limitation, and examples thereof include a method of addition by one operation, a method of addition in fractional amounts and a method of continuous addition. Of these methods, the method of addition by one operation is preferred to the others. Furthermore, the first alkoxysilane compound may be added in the form of a solution containing a conjugated diene monomer, an aromatic vinyl compound, a hydrocarbon solvent or a randomizer or so on as solvent.

As a temperature for the modification reaction, the polymerization temperature of a conjugated diene polymer can be utilized just as it is. Specifically, a temperature range of 0° C. to 120° C. is preferable. Additionally, the range of 20° C. to 100° C. is more preferbale. Decrease in temperature tends to cause an increase in polymer viscosity, whereas increase in temperature tends to cause deactivation of the polymerization active terminal. Therefore, the temperatures falling outside the numerical range specified above are unpreferable. Additionally, the prefrable reaction time in the primary modification reaction is from 1 minute to 5 hours and more preferably from 2 minutes to 1 hour.

On the occasion of production of a conjugated diene polymer, a coupling agent can be added in combination with a first alkoxysilane compound. Examples of the coupling agent include the following ones. Additionally, the coupling agent is added at the stage of modifying the conjugated diene polymer with the first alkoxysilane compound. Specifically, the coupling agent made to react on the polymerization active terminal in combination with the first alkoxysilane compound includes at least one kind of compound selected from the group consisting of (a) an isocyanate compound and/or an isothiocyanate compound, (b) an amide compound and/or an imide compound, (c) a pyridyl-substituted ketone compound and/or a pyridyl-substituted vinyl compound, (d) a silicon compound, (e) an ester compound, (f) a ketone compound, (g) a tin compound, (h) an epoxy compound, (i) a phosphoric ester compound, (j) a compound contaning an acid anhydride group, (k) a compound containing an arylvinyl group and (l) a compound containing halogenated carnon atom(s).

Among the compounds, preferable examples of the isocyanate or isothiocyanate compound of the ingredient (a) include 2,4-tolylenediisocyanate, 2,6-tolylenediisocyanate, diphenylmehtane diisocyanate, diphenylethane diisocyanate, polymeric-type diphenylmethane diisocyanate (C-MDI), isophorone diisocyanate, hexamethylene diisocyante, 1,3,5-benzenetriisocyanate and phenyl-1,4-diisothiocyanate etc.

Suitable examples of the amide or imide compound of the ingredient (b) include amide compounds such as succinamide, phthalamide, N,N,N',N'-tetramethylphthalamide, oxamide, N,N,N',N'-tetramethyloxamide, adipic acid bisdimethylamide and polymethacrylic acid dimethylamide, and imide compounds such as succinimide, N-methylsuccinimide, maleimide, N-methylmaleimide, phthalimide and N-methylphthalimide.

Suitable examples of the pyridyl-substitued ketone or pyridyl-substitued vinyl compound of the ingredient (c) include dibenzoylpyridine, diacetylpyridine and divinylpyridine.

Suitable examples of the silicon compound of the ingredient (d) include dibutyldichlorosilane, methyltrichlorosilane, methyldichlorosilane, tetrachlorosilane, silicon tetrabromide, silicon tetraiodide, monochlorotrimethoxysilane, monobromotrimethoxysilane, dichlorodimethoxysilane, dibromodimethoxysilane, trichloromethoxysilane, tribromomethoxysilane, hexachlorodisilane, bis(trichlorosilyl) methane, 1,2-bis(trichlorosilyl)ethane, 1,3-bis(trichlorosilyl) propane, 1,4-bis(trichlorosilyl)butane, 1,5-bis(trichlorosilyl) pentane, 1,6-bis(trichlorosilyl)hexane, triethoxymethylsilane, triphenoxymethylsilane, trimethoxysilane, methyltriethoxysilane, tetramethoxysilane, tetraethoxysilane, tetrabutoxysilane, 3-acetylpropoxytrimethoxysilane, N-(1,3-dimethylbutylidene)-3-(triethoxysilyl)-1-propaneamine, N-(1,3-dimethylbutylidene)-3-(tributoxysilyl)-1-propaneamine, N-(1-methylpropylidene)-3-(triethoxysilyl)-1-propaneamine, N-ethylidene-3-(triethoxysilyl)-1-propaneamine, N-(3-triethoxysilylpropyl)-4,5-dihydroimidazole, 3-chloropropoxytrimethoxysilane, 4,5-epoxyheptylmethyldimethoxysilane and bis(triethoxysilylpropyl)tetrasulfide etc.

Suitable examples of the ester compound of the ingredient (e) include dimethyl adipate, diethyl adipate, dimethyl terephthalate, diethyl terephthalate, dimethyl phthalate, dimethyl isophthalate, diethyl malonate, diethyl phthalate, diethyl glutarate and diethyl maleate.

Suitable examples of the ketone compound of the ingredient (f) include N,N,N',N'-tetramethyl-4,4'-diaminobenzophenone, N,N,N',N'-tetraethyl(4,4'-diamino)-benzophenone, N,N-dimethyl-1-aminobenzoquinone, N,N,N',N'-tetramethyl-1,3-diaminobenzoquinone, N,N-dimethyl-1-aminoanthraquinone, N,N,N',N'-tetramethyl-1,4-diaminoanthraquinone and 4,4'-diacetylbenzophenone.

Suitable examples of the tin compound of the ingredient (g) include tetrachlorostannate, tetrabromostannate, trichlorobutylstannate, trichloromethylstannate, trichloroethylstannate, trichlorophenylstannate, trichlorooctylstannate, dibromodimethylstannate, dichlorodimethylstannate, dichlorodibutylstannate, dichlorodioctylstannate, 1,2-bis(trichlorostannyl)ethane, 1,2-bis(methyldichlorostannyl)ethane, 1,4-bis(trichlorostannyl)butane, 1,4-bis(methyldichlorostannyl)butane, ethyltin tristearate, butyltin trisoctanoate, butyltin trisstearate, butyltin trislaurate, dibutyltin bisoctanoate, dibutyltin bisstearate and dibutyltin bislaurate.

Suitable examples of the epoxy compound of the ingredient (h) include polyglycidyl ethers of polyhydric alcohol, such as ethylene glycol diglycidyl ether and glycerin triglycidyl ether, polyglycidyl ethers of aromatic compounds having two or more phenyl groups, such as diglycidylated bisphenol A, polyepoxy compounds such as 1,4-diglycidylbenzene, 1,3,5-triglycidylbenzene and polyepoxidated liquid polybutadiene, epoxy group-containing tertiary amines such as 4,4'-diglycidyl-diphenylmethylamine and 4,4'-diglycidyl-dibenzylmethylamine, glycidylamino compounds such as diglycidylaniline, diglycidyl-ortho-toluidine, tetraglycidyl-meta-xylenediamine, tetraglycidylaminodiphenylmethane, tetraglycidyl-p-phenylenediamine, diglycidylaminomethyl-cyclohexane and tetraglycidyl-1,3-bisaminomethylcyclohexane, and compounds having epoxy groups and other functional groups, such as 3-glycidoxypropyltrimethoxysilane, 3-glycidoxypropyltriethoxysilane, 3-glycidoxypropyltributoxysilane, epoxy-modified silicones, epoxidized soybean oil and epoxidized linseed oil.

Suitable examples of the phosphoric ester compound of the ingredient (i) include polyhalogenated phosphorus compounds such as trichlorophosphine and tribromophosphine, and phosphite compounds such as trisnonylphenyl phosphite, trimethyl phosphite and triethyl phosphite, trimethyl phosphate, triethyl phosphate etc.

Suitable examples of the compound containing acid anhydride group of the ingredient (j) include pyromellitic anhydride, a styrene-maleic anhydride copolymer etc.

Suitable examples of the compound containing arylvinyl group of the ingredient (k) include divinylbenzene, diisopropenylbenzene, divinylbenzene oligomers etc.

Suitable examples of the compound containing halogenated carbon group of the ingredient (l) include trichloropropane, tribromopropane, tetrachlorobutane etc.

These compounds made to react on polymerization active terminals in combination with first alkoxysilane compounds may be used alone, or any two or more of them may be used in combination.

Such a coupling agent as recited above is used in an amount of 1 mole or less, preferably from 0.1 to 0.5 mole, in terms of the amount of a substituent capable of a coupling in the coupling agent, per gram-atomic equivalent weight of the alkali metal or alkaline-earth metal of a polymerization initiator used. When the amount used is greater than 1 mole, the reaction rates of first alkoxysilane compounds are lowered, and cases may occur wherein conversion into cross-linked rubber compositions and properties of being excellent in low hysteresis loss and so on cannot be attained.

[Step (b)]

The step (b) is a step of mixing the modified conjugated diene polymer produced at the step (a), an agent for producing onium, a second alkoxysilane compound having an alkoxysilyl group and at least one group convertible into an onium by means of the agent for producing oium per molecule and condensation catalyst containing metal element(s) for alkoxysilane compounds.

Specific examples of a mode for performing the step (b) include the following 10 modes. However, the step (b) should not be construed as being limited to these modes and, even when those ingredients are mixed in any order or in any combination, modified conjugated diene rubber can be produced satisfactorily.

(First Mode for Performance)

A first mode for performance includes (b-1) a step of mixing the modified conjugated diene polymer produced at the step (a) and an agent for producing onium, (b-2) a step of mixing the mixture prepared at the step (b-1) and a second alkoxysilane compound having an alkoxysilyl group and at least one group convertible into an onium by means of the agent for producing onium per molecule, and (b-3) a step of mixing the mixture prepared at the step (b-2) and a condensation catalyst containing metal element(s) for alkoxysilane compounds.

(Second Mode for Performance)

A second mode for performance includes (b-4) a step of mixing the modified conjugated diene polymer produced at the step (a) and an agent for producing onium, (b-5) a step of mixing the mixture prepared at the step (b-4) and condensation catalyst containing metal element(s) for alkoxysilane compounds, and (b-6) a step of mixing the mixture prepared at the step (b-5) and a second alkoxysilane compound having an alkoxysilyl group and at least one group convertible into an onium by means of the an agent for producing onium per molecule.

(Third Mode for Performance)

A third mode for performance includes (b-7) a step of mixing the modified conjugated diene polymer produced at the step (a) and a second alkoxysilane compound having an alkoxysilyl group and at least one group convertible into an onium by means of an agent for producing onium per molecule, (b-8) a step of mixing the mixture prepared at the step (b-7) and an agent for producing onium, and (b-9) a step of mixing the mixture prepared at the step (b-8) and condensation catalyst containing metal element(s) for alkoxysilane compounds.

(Fourth Mode for Performance)

A forth mode for performance includes (b-10) a step of mixing the modified conjugated diene polymer produced at the step (a) and a second alkoxysilane compound having an alkoxysilyl group and at least one group convertible into an onium by means of an agent for producing onium per molecule, (b-11) a step of mixing the mixture prepared at the step (b-10) and a condensation catalyst containing metal element(s) for alkoxysilane compounds, and (b-12) a step of mixing the mixture prepared at the step (b-11) and an agent for producing onium.

(Fifth Mode for Performance)

A fifth mode for performance includes (b-13) a step of mixing the modified conjugated diene polymer produced at the step (a) and a condensation catalyst containing metal element(s) for alkoxysilane compounds, (b-14) a step of mixing the mixture prepared at the step (b-13) and an agent for producing onium, and (b-15) a step of mixing the mixture prepared at the step (b-14) and a second alkoxysilane compound having an alkoxysilyl group and at least one group convertible into an onium by means of the agent for producing onium per one molecule.

(Sixth Mode for Performance)

A sixth mode for performace includes (b-16) a step of mixing the modified conjugated diene polymer produced at the step (a) and a condensation catalyst containing metal element(s) for alkoxysilane compounds, (b-17) a step of mixing the mixture prepared at the step (b-16) and a second alkoxysilane compound having an alkoxysilyl group and at least one group convertible into an onium by means of an agent for producing onium per molecule, and (b-18) a step of mixing the mixture prepared at the step (b-17) and an agent for producing onium.

(Seventh Mode for Performance)

A seventh mode for performance includes (b-19) a step of performing simultaneous mixing of the modified conjugated diene polymer produced at the step (a), an agent for producing onium, a second alkoxysilane compound having an alkoxysilyl group and at least one group convertible into an onium by means of the agent for producing onium per molecule, and a condensation catalyst containing metal element(s) for alkoxysilane compounds.

(Eighth Mode for Performance)

An eighth mode for performance includes (b-20) a step of mixing the modified conjugated diene polymer produced at the step (a), an agent for producing onium and a second alkoxysilane compound having an alkoxysilyl group and at least one group convertible into an onium by means of the agent for producing onium per-molecule, and (b-21) a step of mixing the mixture prepared at the step (b-20) and a condensation catalyst containing metal element(s) for alkoxysilane compounds.

(Ninth Mode for Performance)

A ninth mode for performance includes (b-22) a step of mixing the modified conjugated diene polymer produced at the step (a), an agent for producing onium and a condensation catalyst containing metal element(s) for alkoxysilane compounds, and (b-23) a step of mixing the mixture prepared in the step (b-22) and a second alkoxysilane compound having an alkoxysilyl group and at least one group convertible into an onium by means of the agent for producing onium per molecule.

(Tenth Mode for Performance)

A tenth mode for performance includes (b-24) a step of mixing the modified conjugated diene polymer produced at the step (a), a second alkoxysilane compound having an alkoxysilyl group and at least one group convertible into an onium by means of an agent for producing onium per molecule and a condensation catalyst containing metal element(s) for alkoxysilane compounds, and (b-25) a step of mixing the mixture prepared at the step (b-24) and an agent for producing onium.

Each of the ingredients used at the step (b) is described below.

Examples of an alkoxysilyl group in the second alkoxysilane compound include groups similar to examples of the alkoxysilyl group in the first alkoxysilane compound.

The alkoxysilyl group in the second alkoxysilane compound is at least one and, from a viewpoint of reaction efficiency, it is preferable for the second alkoxysilane compound to have two or three alkoxysilyl groups and it is more preferable to have three alkoxysilyl groups.

Examples of the group present in the second alkoxysilane compound and convertible into an onium include a primary amino group, a secondary amino group, a tertiary amino group, an imino group, a pyridyl group, a primary phosphino group, a secondary phosphino group, a tertiary phosphino group, an epoxy group, an isocyanate group, a thioepoxy group, a hydroxyl group, a carboxyl group, an oxetane group and a thiol group, or an ethanolamine, benzoimidazole, melamine, amidine structure etc. The second alkoxysilane compounds may be used alone, or any two or more of them may be used in combination.

Examples of a compound having an alkoxysilyl group and a primary amino group, a secondary amine group, a tertiary amino group, an imino group, a pyridyl group, a primary phosphino group, a secondary phosphino group, a tertiary phosphino group, an epoxy group, an isocyanate group, a thioepoxy group, a hydroxyl group, a carboxyl group, an oxetane group or a thiol group include not only examples of the first alkoxysilane compound as mentioned in the explanation of the step (a) but also 3-aminopropyltrimethoxysilane, 3-aminopropyltriethoxysilane, 3-mercaptomethyltrimethoxysilane, 3-mercaptomethyltriethoxysilane, 3-mercaptopropyltrimethoxysilane, 3-mercaptopropyltriethoxysilane, aminophenyltrimethoxysilane, aminophenyltriethoxysilane, 3-(N-methylamino)propyltrimethoxysilane, 3-(N-methylamino)propyltriethoxysilane, N-(2-aminoethyl)-3-aminopropyltrimethoxysilane, 2-(6-aminohexyl)aminopropyltrimethoxysilane, the mercpatosilane compounds recited in JP-A-2006-249069, 3-glycidoxypropyltrimethoxysilane, 3-glycidoxypropyltriethoxysilane, 3-glycidoxypropyltributoxysilane, epoxy-modified silicones, 2-(3,4-epoxy-cyclohexyl)ethyltrimethoxysilane, 3-glycidoxypropylmethyldiethoxysilane, 3-isocyanatopropyltriethoxysilane, 3-isocyanatopropyltrimethoxysilane, 3-isocyanatopropylmethyldiethoxysilane etc.

Mixing of such a second alkoxysilane compound and another ingredient (e.g. the modified conjugated diene polymer produced at the step (a)) can be carried out e.g. in a solution. The mixing has no particular limitation as to its form, and it may be carried out by using a batch-type mixer or it may be carried out in a continuous mode by using an instrument such as a multistage continuous mixer or an in-line mixer. In addition, it is preferable that the reaction by this mixing be performed in advance of various operations required for solvent removal treatment, water treatment, heat treatment and isolation of the polymer after completion of polymerization reaction.

It is preferable that the amount of a second alkoxysilane compound used in the mixing is at least 0.2 mole-equivalent weight, the mount is more preferably at least 0.3 mole-equivalent weight, with respect to the active site of the conjugated diene polymer produced by anionic polymerization. When the amount used is smaller than 0.2 mole-equivalent weight, capture of the second alkoxysilane compound with conversion into an onium is not enough, and the ability to disperse a reinforcing agent cannot be improved to a sufficient degree. As a result, when the reaction product is made into a cross-linked rubber composition, cases may occur in which the composition made is inferior in tensile strength, abrasion resistance, wet skid resistance and low hysteresis-loss property. Additionally, it is also possible to use the same one both as the first alkoxysilane compound and the second alkoxysilane compound. In this case, the first alkoxysilane compound may be used in an amount of 1.2 mole-equivalent weight or more with respect to the active site of the conjugated diene polymer produced by anionic polymerization.

In this connection, the method for adding the second alkoxysilane compound as a modifier has no particular limitation, and examples thereof include a method of addition by one operation, a method of addition in fractional amounts and a method of continuous addition. Of these methods, the method of addition by one operation is preferred to the others. Additionally, the second alkoxysilane compound may be added in the form of a solution containing a hydrocarbon solvent or such a randomizer or so on as solvent.

As a temperature at which the second alkoxysilane compound is mixed with another ingredient (e.g. the modified conjugated diene polymer produced at the step (a)), the polymerization temperature of the conjugated diene polymer can be utilized just as it is. Specifically, a suitable range of the temperature is from 0° C. to 120° C. Additionally, a more suitable range is from 20° C. to 100° C. Decrease in the temperature tends to cause an increase in polymer viscosity, whereas increase in the temperature tends to cause deterioration of the polymerization active terminal. Therefore, the temperatures falling outside the numerical range specified above are unsuitable. In addition, the suitable mixing time is preferably from 1 minute to 5 hours and more preferably from 2 minutes to 1 hour.

Examples of the agent for producing onium include silicon halide compounds, metal halides such as a tin halide compound, an aluminum halide compound, a titanium halide compound, a zirconium halide compound, a germanium halide compound, a gallium halide compound, a zinc halide compound etc., a sulfuric ester, a phosphoric ester, a carbonic ester, a nitric ester, a carboxylic acid, a sulfonic acid, inorganic acids such as hydrofluoric acid, hydrochloric acid, hydrobromic acid, hydroiodic acid, sulfuric acid, nitric acid, carbonic acid, phosphoric acid etc., salts of inorganic acids such as potassium fluoride, tetramethylammonium fluoride, tetra-n-butylammonium fluoride etc., and organic acids such as a carboxylic acid, a sulfonic acid, a surfuric ester, a phosphoric ester, a carbonic ester, a nitric ester etc.

Examples of compounds for the agent for producing onium include silicon tetrachloride, tin tetrachloride, trimethylsilyl chloride, dimethyldichlorosilane, methyltrichlorosilane, methyldichlorosilane, diethylaluminum chloride, ethylaluminum sesquichloride, ethylaluminum dichloride, titanium tetrachloride, titanocene dichloride, zirconium tetrachloride, zirconocene dichloride, germanium tetrachloride, gallium trichloride, zinc chloride, diethyl sulfate, dimethyl sulfate, magnesium laureth sulfate, trimethyl phosphate, triethyl phosphate, tributyl phosphate, 2-ethylhexyl phosphate, triphenyl phosphate, tricresyl phosphate, dimethyl carbonate, diethyl carbonate, ethylene carbonate, propylene carbonate, nitrocellulose, nitroglycerin, nitroglycol, formic acid, acetic acid, oxalic acid, maleic acid, citric acid, malic acid, fumaric acid, malonic acid, acrylic acid, crotonic acid, succinic acid, glutaric acid, itaconic acid, tartaric acid, sebacic acid, terephthalic acid, isophthalic acid, β-mercaptopropionic acid, benzenesulfonic acid, p-toluenesulfonic acid, hydrofluoric acid, hydrochloric acid, hydrobromic acid, hydroiodic acid, sulfuric acid, nitric acid, carbonic acid, phosphoric acid, potassium fluoride, tetramethylammonium fluoride and tetra-n-butylammonium fluoride.

All of the agents for producing onium have similar action in terms of possibility of making groups convertible into oniums convert into oniums. Even if some of them are not mentioned in the following Examples, they can be used in the present invention.

Mixing of an agent for producing onium as recited above and other ingredients (e.g. the mixture of the modified conjugated diene polymer produced at the step (a) and the second alkoxysilane compound) can be performed e.g. in a solution. The mixing has no particular limitation as to its form, and it may be carried out by using a batch-type mixer or it may be carried out in a continuous mode by using an instrument such as a multistage continuous mixer or an in-line mixer.

The suitable amount of the agent for producing onium used is preferably at least 1.0 mole-equivalent weight and more preferably at least 1.5 mole-equivalent weight, with respect to the active site of the conjugated diene polymer produced by anionic polymerization. When the amount used is smaller than 1.0 mole-equivalent weight, the progress of conversion into the onium is not adequate which sometimes resulting in the rubber produced being inferior in shape-retaining property.

The method for adding the agent for producing onium has no particular limitation, and examples thereof include a method of addition by one operation, a method of addition in fractional amounts and a method of continuous addition. Of these methods, the method of addition by one operation is preferred to the others. Additionally, the agent for producing may be added in the form of a solution containing as a solvent such a hydrocarbon solvent or such a randomizer or so on.

As a temperature at which the agent for producing onium is mixed with other ingredients (e.g. a mixture of the modified conjugated diene polymer produced at the step (a) and the second alkoxysilane compound), the polymerization temperature of the conjugated diene polymer can be utilized just as it is. Specifically, a preferable range of the temperature is from 0° C. to 120° C. Additionally, the range of 20° C. to 100° C. is more preferable. Decrease in the temperature tends to cause an increase in polymer viscosity, whereas increase in the temperature tends to cause deterioration of the polymerization active terminal. Therefore, the temperatures falling outside the numerical range specified above are unsuitable. Additionally, the suitable mixing time is preferably from 1 minute to 5 hours, and more preferably from 2 minutes to 1 hour.

In this connection, in the present method for producing modified conjugated diene rubber, the modified conjugated diene polymer can be collected after addition of the agent for producing onium by conducting solvent-removal (e.g. steam stripping or the like) and drying operations which are known in the production of conjugated diene polymers.

The method of forming onium structures through contact between the agent for producing onium and water has no particular limitation, and preferable examples thereof include (i) a method of adding water directly to the polymer solution after the step (b) and mixing them, (ii) a method of adding a solution prepared by dissolving water in an organic solvent soluble in both water and organic solvents such as alcohol to the polymer solution after the step (b) and mixing the solutions, and (iii) a method of mixing the polymer solution and/or the polymer and water simultaneously with solvent removal in the steam stripping process after the step (b). Of these methods, (iii) a method of mixing the polymer solution and/or the polymer and water simultaneously with solvent removal in the steam stripping process after the step (b) is especially preferred in terms of effective formation of onium structure.

Additionally, it is preferable that temperature at the reaction time is from 30° C. to 150° C. and temperature is more preferable from 80° C. to 120° C.

The modified conjugated diene polymer used at the step may be in the state of a polymer solution which is made at the time of production of the modified conjugated diene polymer and does not undergo removal of the solvent yet, or it may be prepared by isolating the polymer through solvent removal from the polymer solution by steam stripping or the like and subsequent drying, and then by dissolving the polymer again in a solvent such as cyclohexane.

As the condensation catalyst containing metal element(s) for alkoxysilane compounds (hereafter simply referred to as "condensation catalyst" too), it is preferable to use a condensation catalyst including a metallic compound which contains at least one metal element selected from among metal elements included in the group 4, the group 12, the group 13, the group 14 and the group 15 of the periodic table. To be more specifically, suitable examples of the metal element(s) include titanium, zirconium, aluminum, bismuth and tin.

Additionally, as the condensation catalyst containing metal element(s) for alkoxysilane compounds, alkoxides, carboxylates or acetylacetonate complex salts of the metal elements recited above are preferable.

More specifically, examples of the condensation catalyst include titanium tetramethoxide, titanium tetraethoxide, titanium tetra-n-propoxide, titanium tetra-i-propoxide, titanium tetra-n-butoxide, titanium tetra-n-butoxide oligomer, titanium tetra-sec-butoxide, titanium tetra-tert-butoxide, titanium tetra(2-ethylhexyl oxide), titanium bis(octanedioleate) bis(2-ethylhexyl oxide), titanium tetra(octanedioleate), titanium lactate, titanium dipropoxide bis(triethanolaminate), titanium dibutoxide bis(triethanolaminate), titanium dibutoxide bis(triethanolaminate), titanium tributoxide stearate, titanium tripropoxide stearate, titanium tripropoxide acetylacetonate, titanium dipropoxide bis(acetylacetonate), titanium tripropoxide ethylacetoacetate, titanium propoxide acetylacetonate bis(ethylacetoacetate), titanium tributoxide acetylacetonate, titanium dibutoxide bis(acetylacetonate), titanium tributoxide ethylacetoacetate, titanium butoxide acetylacetonate bis(ethylacetoacetate), titanium tetrakis(acetylacetonate) and titanium diacetylacetonate bis(ethylacetoacetate).

In addition, examples of the condensation catalyst also include bis(2-ethylhexanoato)titanium oxide, bis(laurato)titanium oxide, bis(naphthato)titanium oxide, bis(stearato)titanium oxide, bis(oleato)titanium oxide, bis(linoleato)titanium oxide, tetrakis(2-ethylhexanoato)titanium, tetrakis (laurato)titanium, tetrakis(naphthato)titanium, tetrakis (stearato)titanium, tetrakis(oleato)titanium, tetrakis (linoleato)titanium, tris(2-ethylhexanoato)bismuth, tris (laurato)bismuth, tris(naphthato)bismuth, tris(stearato) bismuth, tris(oleato)bismuth and tris(linoleato)bismuth.

Further, examples of the condensation catalyst include zirconium tetraethoxide, zirconium tetra-n-propoxide, zirconium tetra-i-propoxide, zirconium tetra-n-butoxide, zirconium tetra-sec-butoxide, zirconium tetra-tert-butoxide, tetra (2-ethylhexyl)zirconium, zirconium tributoxide stearate, zirconium tributoxide acetylacetonate, zirconium dibutoxide bis(acetylacetonate), zirconium tributoxide ethylacetoacetate, zirconium butoxide acetylacetonate bis(ethylacetoacetate), zirconium tetrakis(acetylacetonate), zirconium diacetylacetonate bis(ethylacetoacetonate), bis(2-ethylhexanoato)zirconium oxide, bis(laurato)zirconium oxide, bis (naphthato)zirconium oxide, bis(stearato)zirconium oxide, bis(oleato)zirconium oxide, bis(linoleato)zirconium oxide, tetrakis(2-ethylhexanoato)zirconium, tetrakis(laurato)zirconium, tetrakis(naphthato)zirconium, tetrakis(stearato)zirconium, tetrakis(oleato)zirconium and tetrakis(linoleato)zirconium.

Furthermore, examples of the condensation catalyst include aluminum triethoxide, aluminum tri-n-propoxide, aluminum tri-i-propoxide, aluminum tri-n-butoxide, aluminum tri-sec-butoxide, aluminum tri-tert-butoxide, tri(2-ethylhexyl)aluminum, aluminum dibutoxide stearate, aluminum dibutoxide acetylacetonate, aluminum butoxide bis(acetylacetonate), aluminum dibutoxide ethylacetoacetate, aluminum tris(acetylacetonate), aluminum tris(ethylacetoacetate), tris (2-ethylhexanoato)aluminum, tris(laurato)aluminum, tris (naphthato)aluminum, tris(stearato)aluminum, tris(oleato) aluminum, tris(linoleato)aluminum, bis(n-octanoato)tin, bis (2-ethylhexanoato)tin, tin dilaurate, tin dinaphthoenate, tin distearate, tin dioleate, dibutyltin distearate, dibutyltin bis(n-octanoate), dibutyltin bis(2-ethylhexanoate), dibutyltin dilaurate, dibutyltin malate, dibutyltin bis(benzylmalate), dibutyltin bis(2-ethylhexylmalate), di-n-octyltin diacetate, di-n-octyltin bis(n-octanoate), di-n-octyltin bis(2-ethylhexanoate), di-n-octyltin dilaurate, di-n-octyltin malate, di-n-octyltin bis(benzylmalate) and di-n-octyltin bis(2-ethylhexylmalate).

Of these condensation catalysts, titanium tetrakis(2-ethylhexyl oxide), titanium tetra(octanedioleate), tris(2-ethylhexanoato)bismuth, zirconium tetra-n-propoxide, zirconium tetra-n-butoxide, bis(2-ethylhexanoato)zirconium oxide, bis (oleato)zirconium oxide, aluminum tir-i-propoxide, aluminum tri-sec-butoxide, tris(2-ethylhexanoato)aluminum, tris (stearato)aluminum, zirconium tetrakis(acetylacetonate), aluminum tris(acetylacetonate), bis(2-ethylhexanoato)tin and di-n-octyltin bis(2-ethylhexylmalate) can be cited as preferable examples.

In the mixing, the amount of such a catalyst used for condensation containing metal element(s) of alkoxysilane compounds is preferably from 0.1 to 10 mole-equivalent weight and more preferably from 0.2 to 5 mole-equivalent weight, with respect to the alkoxysilyl group present in the reaction system. When the amount used is smaller than 0.1 mole-equivalent weight, the progress of the condensation reaction is not adequate. On the other hand, the use of the condensation catalyst in an amount larger than 10 mole-equivalent weight is undesirable from an economic point of view because the progress of the condensation reaction is already speeded up to saturation.

In this connection, the method for adding the condensation catalyst as a modifier has no particular limitation, and examples thereof include a method of addition by one operation, a method of addition in fractional amounts and a method of continuous addition. Of these methods, the method of addition by one operation is preferred to the others. Additionally, the condensation catalyst may be added in the form of a solution containing as solvent such a hydrocarbon solvent, such a randomizer.

Additionally, even when some of the foregoing condensation catalysts containing metal element(s) for alkoxysilane compounds are not mentioned in Examples described later, they can be used in the present invention from the standpoint that they accelerate reaction or interaction of the alkoxysilyl groups and the groups convertible into oniums which are derived from first alkoxysilane compounds and the alkoxysilyl groups and the groups convertible into oniums which are derived from second alkoxysilane compounds which are introduced into a conjugated diene polymer with carbon black and/or silica acting as a reinforcing agent in making a rubber composition, by which a property of being excellent in low hysteresis loss in making into cross-linked rubber compositions is imparted.

A temperature for mixing the condensation catalyst with other ingredient (e.g. the modified conjugated diene polymer produced at the step (a)) is preferably from 0° C. to 120° C. and more preferably from 20° C. to 100° C. Decrease in the temperature tends to cause an increase in polymer viscosity, whereas increase in the temperature tends to cause deterioration of the polymerization active terminal. Therefore, the temperatures falling outside the numerical range specified above are preferable.

On the other hand, a mixing time is preferably from 1 minute to 5 hours, and more preferably from 2 minutes to 1 hour. The mixing time shorter than 1 minute does not allow completion of mixing, while the mixing time longer than 5 hours is undesirable since the mixing has already reached to saturation.

[2] Modified Conjugated Diene Rubber:

The modified conjugated diene rubber according to an embodiment of the present invention is modified conjugated diene rubber produced by the use of the hitherto described method for producing modified conjugated diene rubber. The modified conjugated diene rubber like the above has high in Mooney viscosity; and is superior in shape stability and excellent in workability. The suitable Mooney viscosity (ML 1+4, 100° C.) of the modified conjugated diene rubber of this embodiment is preferably from 30 to 150 and more preferably from 40 to 120. When Mooney viscosity (ML 1+4, 100° C.) is lower than 30, the shape stability shows downward tendency. On the other hand, when the rubber has Mooney viscosity (ML 1+4, 100° C.) higher than 150, the workability thereof deteriorates, and sometimes it becomes difficult to knead the rubber with a compounding agent. In this connection, when its Mooney viscosity is too high, the rubber is generally oil-extended with extension oil so as to have Mooney viscosity in the above-specified range.

As the extension oil, aromatic oil, naphthene oil, paraffin oil or an aromatic-oil substitute with a PCA content lower than 3 mass % as measured by Method IP 346 is suitable for use. Although the extension oil may be used in an arbitrary amount, it is usually used in an amount of 10 to 50 parts by mass with respect to 100 parts by mass of the modified conjugated diene rubber. In most cases where extension oil is used, the amount mixed is generally from 20 to 37.5 parts by mass. As to the extension oil named from the classification by manufacturing process, T-DAE (Treated Distillate Aromatic Extract) oil, T-RAE (Treated Residual Aromatic Extract) oil, MES (Mild Extract Solvate) oil, RAE (Residual Aromatic Extract) oil and the like can be used suitably.

[3] Rubber Composition:

The rubber composition, another embodiment of the present invention, is a rubber composition which includes as a rubber ingredient the modified conjugated diene polymer as mentioned above. Details thereof are described below.

[3-1] Rubber Ingredients:

The modified conjugated diene rubber included in the rubber composition of the embodiment is rubber containing the modified conjugated diene polymer as mentioned above. It is preferable that the percentage of modified conjugated diene polymer content in the modified conjugated diene rubber be 20 mass % or higher; it is more preferable that the percentage is 30 mass % or higher; and it is particularly preferable that the percentage is 40 mass % or higher. By adjusting the content percentage to be 20 mass % or higher, mechanical properties, such as tensile strength and elongation by stretching, crack-growth resistance and abrasion resistance of the cross-linked rubber composition prepared can be made more satisfactory.

Additionally, the modified conjugated diene rubber may contain one kind of modified conjugated diene polymer, or it may contain two or more kinds of modified conjugated diene polymers. Besides containing the modified conjugated diene polymer(s), the modified conjugated diene rubber may contain other rubber ingredients. Examples of other rubber ingredients include natural rubber, synthetic isoprene rubber, butadiene rubber, modified butadiene rubber, styrene-butadiene rubber, modified styrene-butadiene rubber, ethylene-α-olefin copolymer rubber, ethylene-α-olefin-diene copolymer rubber, acrylonitrile-butadiene copolymer rubber, chloroprene rubber, halogenated butyl rubber, styrene-isoprene copolymer rubber, butadiene-isoprene copolymer rubber, random styrene-butadiene-isoprene copolymer rubber, styrene-acrylonitrile-butadiene copolymer rubber, acrylonitrile-butadiene copolymer rubber and polystyrene-polybutadiene-polystyrene block copolymer, and mixtures thereof. Even when other rubber ingredients publicly known to be usable in rubber compositions for tire use are incorporated, it is possible to produce cross-linked rubber superior in low hysteresis-loss property.

[3-2] Other Ingredients (Carbon Black, Silica):

It is preferable that the rubber composition of the embodiment further include carbon black and/or silica. Examples of carbon black include furnace black, typified by SRF, GPF, FEF, HAF, ISAF, SAF, ISAF-HS, ISAF-LS, IISAF-HS, HAF-HS and HAF-LS, acetylene black, thermal black, channel black and graphite, and further include carbon black of various grades, such as graphite fibers and fullerenes. Additionally, it is appropriate for the carbon black to have iodine adsorption (IA) of 60 mg/g or above and dibutyl phthalate oil absorption (DBP) of 80 ml/100g or above. The use of carbon black increases effects on improvements in grip performance and fracture resistance characteristics of cross-linked rubber compositions. Of the carbon black products, HAF, ISAF and SAF are preferred because of their excellence in abrasion resistance. Those varieties of carbon black may be used alone, or any two or more of them may be used in combination.

Examples of silica include wet silica (hydrated silicic acid), dry silica (silicic acid anhydride), colloidal silica, precipitated silica, calcium silicate, aluminum silicate etc. Of these various types of silica, wet silica is preferred over the others because of its remarkable effects on improvements in fracture resistance characteristics and compatibility between wet skid resistance and a low hysteresis-loss property. Additionally, it is also preferable to use silica of high dispersible type from the viewpoints of physical properties and workability because the use of such silica ensures satisfactory dispersion into rubber. Those types of silica may be used alone, or any two or more of them may be used in combination.

It is preferable that the rubber composition of the embodiment is a rubber composition containing carbon black and/or silica in an amount of 20 to 130 parts by mass with respect to 100 parts by mass of rubber ingredients (the sum of modified conjugated diene polymer(s) and other rubber ingredients), and the amount is preferably from 25 to 110 parts by mass from the viewpoint of reinforcement and its accompanying effect on improvements in various physical properties. In this connection, when the percentage of carbon black and/or silica content is low, there is a tendency toward insufficiency of effect on improvements in fracture resistance characteristics and so on; while, when the percentage of carbon black and/or silica content is high, there is a tendency toward reduction in workability of rubber compositions. Therefore, it is preferable that the content percentage be within the numerical range specified above. On the other hand, by compounding a carbon-silica dual phase filler with the present copolymer rubber, an excellent advantage similar to the advantage brought by the combined use of carbon black and silica can be obtained. The carbon-silica dual phase filler is carbon black to the surface of which silica is chemically bonded, or the so-called silica coating carbon black. Examples thereof include products of Cabot Corporation marketed under the trade names of CRX2000, CRX2002 and CRX2006. The suitable amount of carbon-silica dual phase filler compounded is from 1 to 100 parts by mass, preferably from 5 to 95 parts by mass, with respect to 100 parts by mass of the total for rubber ingredients.

In the case of incorporating silica as a reinforcing agent into the rubber composition of the embodiment, mixing a silane coupling agent into silica is favorable for further improvement in reinforcing effect of silica. Examples of such a silane coupling agent include bis(3-triethoxysilylpropyl) tetrasulfide, bis(3-triethoxysilylpropyl) trisulfide, bis(3-triethoxysilylpropyl) disulfide, bis(2-triethoxysilylethyl) tetrasulfide, bis(3-trimethoxysilylpropyl) tetrasulfide, bis(2-trimethoxysilylethyl) tetrasulfide, 3-mercaptopropyltrimethoxysilane, 3-mercaptopropyltriethoxysilane, 2-mercaptoethyltrimethoxysilane, 2-mercaptoethyltriethoxysilane, 3-trimethoxysilylpropyl-N,N-dimethylthiocarbamoyl tetrasulfide, 3-triethoxysilylpropyl-N,N-dimethylthiocarbamoyl tetrasulfide, 2-triethoxysilylethyl-N,N-dimethylthiocarbamoyl tetrasulfide, 3-trimethoxysilylpropylbenzothiazolyl tetrasulfide, 3-triethoxysilylpropylbenzolyl tetrasulfide, 3-triethoxysilylpropylmethacrylate monosulfide, 3-trimethoxysilylpropylmethacrylate monosulfide, bis(3-diethoxymethylsilylpropyl) tetrasulfide, 3-mercaptopropyldimethoxymethylsilane, dimethoxymethylsilylpropyl-N,N-dimethylthiocarbamoyl tetrasulfide, dimethoxymethylsilylpropylbenzothiazolyl tetrasulfide, vinyltriethoxysilane, β-(3,4-epoxycyclohexyl)ethyltrimethoxysilane, N-(β-aminoethyl)-γ-aminopropyltrimethoxysilane, 3-octathio-1-propyl-triethoxysilane, γ-trimethoxysilylpropyldimethylthiocarbamyl tetrasulfide, γ-trimethoxysilylpropylbenzothiazyl tetrasulfide, and the mercaptosilane compounds recited in JP-A-2006-249069.

Examples of a commercially available silane coupling agent include products of Momentive Performance Materials Inc., marketed under the trade names "NXT Silane", "NXT-Low-V Silane" and "NXT Ultra Low-V Silane", a product of Degussa AG, marketed under the trade name "VP Si363", and a product of Gelest Inc., marketed under the trade name "11-MERCAPTOUNDECYLTRIMETHOXYSILANE".

Of these silane coupling agents, bis(3-triethoxysilylpropyl) polysulfide, 3-trimethoxysilylpropylbenzothiazyl tetrasulfide and the mercaptosilane compounds recited in JP-A-2006-249069 are favorable in point of their effects on improvement in reinforcing capability and the like.

Additionally, these coupling agents can be used alone, or any two or more of them can be used in combination. Although it differs depending on the type and so on, the suitable amount of a silane coupling agent cpmpounded, is from 1 to 20 parts by mass, preferably from 3 to 15 parts by mass, with respect to 100 parts by mass of silica. When the amount of a silane coupling agent mixed is less than one part by mass, effects of the silane coupling agent tend to become difficult to sufficiently produce. On the other hand, when the amount mixed is more than 20 parts by mass, the silane coupling agent tends to easily cause gelation of rubber ingredients.

Various compounding agents in the present rubber composition have no particular limitation and it is also possible to add a compatibility-imparting agent at the time of kneading for the purpose of improving the workability under kneading or further enhancing a balance between wet skid resistance, a low hysteresis-loss property, abrasion resistance and so on. The compatibility-imparting agent suitable for use is an organic compound chosen from among compounds containing an epoxy group, carboxylic acid compounds, carboxylate compounds, ketone compounds, ether compounds, aldehyde compounds, compounds containing a hydroxyl group or compounds containing an amino group, or a silicon compound chosen from among alkoxysilane compounds, siloxane compounds or aminosilane compounds. Examples of the organic compound as a compatibility-imparting agent include the following compounds.

Compounds containing an epoxy group: butyl glycidyl ether, diglycidyl ether, propylene oxide, neopentyl glycol diglycidyl ether, epoxy resin, epoxidized soybean oil, epoxidized fatty acid esters and the like.

Carboxylic acid compounds: adipic acid, octylic acid, methacrylic acid and the like.

Carboxylate compounds: acrylic acid esters, diethylene acrylate, ethyl methacrylate, orthoacetic acid esters, ethyl acetoacetate, butyl acetate, isopropyl acetate, dimethyl carbonate, p-hydroxyphenyl acetate, polyester-type plasticizers, stearic acid-type plasticizers and the like.

Ketone compounds: methylcyclohexanone, acetyl acetone and the like.

Ether compounds: isopropyl ether, dibutyl ether and the like.

Aldehyde compounds: undecylene aldehyde, decyl aldehyde, vanillin, 3,4-dimethoxybenzaldehyde, cuminaldehyde and the like.

Compounds containing an amino group: isopropylamine, diisopropylamine, triethylamine, 3-ethoxypropylamine, 2-ethylhexylamine, isopropanolamine, N-ethylethylenediamine, ethyleneimine, hexamethylenediamine, 3-lauryloxypropylamine, aminophenol, aniline, 3-isopropoxyaniline, phenylenediamine, aminopyridine, N-methyldiethanolamine, N-methylethanolamine, 3-amino-1-propanol, ethylamine hydrochloride, n-butylamine hydrochloride and the like.

Compounds containing a hydroxyl group: isopropyl alcohol, butanol, octanol, octanediol, ethylene glycol, methylcyclohexanol, 2-mercaptoethanol, 3-methyl-3-methoxy-1-butanol, 3-methyl-1,5-pentanediol, 1-octadecanol, diethylene glycol, butylene glycol, dibutylene glycol, triethylene glycol and the like.

Of these compounds, compounds containing an epoxy group, compounds containing an amino group and compounds containing a hydroxyl group are preferable.

Examples of a silicon compound as a compatibility-imparting agent include the following compounds.

Alkoxysilane compounds: trimethylmethoxysilane, trimethylethoxysilane, dimethyldimethoxysilane, methyltriethoxysilane, methyltriphenoxysilane, tetraethoxysilane, methyldiethoxysilane, vinyltrimethoxysilane and the like.

Siloxane compounds: dimethylsiloxane oligomer, silicone oil, amino-modified silicone oil, epoxy-modified silicone oil, carboxyl-modified silicone oil, polyether-modified silicone oil, alkyl-modified silicone oil, higher fatty acid ester-modified silicone oil, higher alkoxy-modified silicone oil, higher fatty acid-containing silicone oil and the like.

Aminosilane compounds: hexamethyldisilazane, nonamethyltrisilazane, anilinotrimethylsilane, bis(dimethylamino)dimethylsilane, bis(diethylamino)dimethylsilane, triethylaminosilane and the like.

Of these compounds, the silazane compounds and bis(dimethylamino)dimethylsilane are preferable.

To the rubber composition of the embodiment, various kinds of chemicals and additives commonly used in rubber industry can be added, if desired, to the extent wherein the aims of the present invention are not impaired. Examples of various kinds of chemicals and additives which can be added to the rubber composition of the embodiment include a cross-linking agent (e.g. vulcanizing agent), a vulcanizing assistant, a working assistant, a vulcanization accelerator, process oil, an anti-aging agent, an anti-scorching agent, zinc oxide and stearic acid.

Examples of the vulcanizing agent include sulfur, sulfur halides, organic peroxides, quinone dioximes, organic polyamine compounds, and alkylphenol resins containing methylol group.

However, sulfur is commonly used as the vulcanizing agent.

It is appropriate that the amount of a vulcanizing agent used be from 0.1 to 5 parts by mass, preferably from 0.5 to 3 parts by mass, with respect to 100 parts by mass of the modified conjugated diene rubber (starting material rubber; rubber ingredients).

As the vulcanizing assistant and the working assistant, stearic acid is generally used. The amount of these assistants used is usually from 0.5 to 5 parts by mass with respect to 100 parts by mass of the modified conjugated diene rubber.

The vulcanization accelerator has no particular limitation, and examples thereof include compounds of sulfenamide type, guanidine type, thiuram type, thiourea type, thiazole type, dithiocarbamic acid type or xanthogenic acid type. Suitable examples of the compounds include 2-mercaptobenzothiazole, dibenzothiazyl disulfide, N-cyclohexyl-2-benzothiazylsulfenamide, N-t-butyl-2-benzothiazolesulfenamide, N-oxyethylene-2-benzothiazolesulfenamide, N-oxyethylene-2-benzothiazolesulfenamide, N,N'-diisopropyl-2-benzothiazolesulfenamide, diphenylguanidine, diorthotolylguanidine, orthotolylbisguanidine etc. The amount of a vulcanization accelerator used is generally from 0.1 to 5 parts by mass, preferably from 0.4 to 4 parts by weight, with respect to 100 parts by mass of the modified conjugated diene rubber.

The present rubber composition can be prepared through kneading with a kneader, such as an open kneader, such as a roll-type open kneader, or a closed kneader, such as a Banbury mixer. Additionally, the present rubber composition can be applied to various rubber products by cross-linking (vulcanization) subsequent to molding. The cross-linked rubber composition (rubber composition having undergone cross-linking) of the embodiment is suitable for use for tire, such as tire tread, under tread, a carcass, a side wall and a bead component; applications to industrial products, such as a rubber cushion, a fender, a belt and a hose, and so on. The cross-linked rubber composition of the embodiment is especially suitable for application to rubber for tire tread. Each of the products in the present invention, namely the modified conjugated diene polymer (produced at the step (a)), the modified conjugated diene rubber (produced at the step (b)), the rubber composition and the cross-linked rubber composition, has the following physical properties and so on.

From the viewpoint of ensuring a balance between shape stability of the modified conjugated diene rubber and workability in preparing the rubber composition, the weight-average molecular weight of the conjugated diene polymer before modification is preferably from 10,000 to 1,500,000, more preferably from 50,000 to 1,000,000, especially preferably from 100,000 to 800,000, as measured by gel permeation chromatography (GPC) and calculated in terms of polystyrene.

It is preferable that the suitable glass transition temperature of the modified conjugated diene rubber is 0° C. or below; it is more preferable that the temperature is −5° C. or below; and it is especially preferable that the temperature is −10° C. or below, from the viewpoint of ensuring a balance between a low hysteresis-loss property and wet skid resistance of the cross-linked rubber composition to be prepared.

The Mooney viscosity (ML 1+4, 100° C.) of the modified conjugated diene rubber is preferably from 30 to 150 and more preferably from 40 to 120, from the viewpoint of ensuring a balance between shape stability of the modified conjugated diene rubber and workability in preparing the rubber composition.

It is preferable that cold flow value (mg/min) of the modified conjugated diene rubber is 1.5 or below; it is more preferable htat the value is 1.0 or below; and it is especially preferable that the vakue is 0.5 or below, from the viewpoint of shape stability of the modified conjugated diene rubber.

The Mooney viscosity (ML 1+4, 100° C.) of the rubber composition is preferably from 20 to 150, more preferably from 30 to 130, and especially preferably from 40 to 110, from the viewpoint of workability in making tires.

It is preferable that the index of tensile strength (JIS K 6301, 300% modulus) of the cross-linked rubber composition is 100 or above, and it is more preferable that the index is 103 or above.

It is preferable that index of tanδ which the cross-linked rubber composition has at 0° C. is 126 or above and it is more preferable that the index is 130 or above.

It is preferable that the index of tanδ which the cross-linked rubber composition has at 70° C. is 128 or above and it is more preferable that the index is 135 or above.

It is preferable that the index of abrasion resistance (JIS K 6264, load 10N, 25° C.) of the cross-linked rubber composition is 105 or above; it is more preferable that the index is 110 or above; and it is especially preferable that the index is 113 or above.

EXAMPLES

Although the present invention is explained specifically on the basis of the following examples, the present invention should not be construed as being limited to these examples. Additionally, all "parts" and "percentages" in the following examples and comparative examples are by mass unless otherwise indicated. Additionally, methods for measuring the values of various physical properties are indicated below.

[Bound styrene content (%)]: The value thereof was determined by 500 MHz $^1$H-NMR.

[Vinyl content (%)]: The value thereof was determined by 500 MHz $^1$H-NMR.

[Glass transition temperature (° C.)]: The value thereof was measured in conformity with ASTM D3418.

[Molecular weight before modification]: The value thereof was determined from a retention time corresponding to the top of a maximum peak on a GPC curve prepared through the use of gel permeation chromatography (GPC) (HLC-8120GPC, trade name, a product of Tosoh Corporation) and calculated in terms of polystyrene.

(Conditions of GPC)

Column: Two of columns marketed under the trade name of "GMHHXL" (from Tosoh Corporation)

Column temperature: 40° C.
Mobile phase: Tetrahydrofuran
Flow velocity: 1.0 ml/min
Sample concentration: 10 mg/20 ml

[Mooney viscosity (ML 1+4, 100° C.)]: The value thereof was determined in conformity with JIS K6300 and by using an L-rotor under conditions that preheating was carried out for 1 minute and the rotor was operated for 4 minutes at a temperature of 100° C.

[Cold flow value (mg/min)]: A copolymer was kept at a temperature of 50° C. and extruded from a 6.35 mm orifice under a pressure of 24.1 kPa. After a lapse of 10 minutes from the time of extrusion (after becoming the extrusion speed to be uniform), the amount (mg) of the copolymer extruded was measured every 30 minutes during 90 minutes, and the average of the measured amounts was defined as a cold flow value (mg/min). The greater the value, the poorer shape stability the rubber has and the harder its handling becomes.

Example 1

Synthesis of Modified Conjugated Diene Rubber A, and Evaluation Thereof

Into a nitrogen-displaced autoclave reactor having an interior volume of 5 liter 2,750 g of cyclohexane, 50.0 g of tetrahydrofuran, 125 g of styrene and 365 g of 1,3-butadiene were charged. The contents in the reactor were adjusted to have a temperature of 10° C., and then polymerization was initiated by addition of a cyclohexane solution containing n-butyl lithium (5.80 mmol). The polymerization was carried out under adiabatic conditions, and the maximum temperature reached to 85° C.

When the conversion rate in the polymerization reached to 99%, 10 g of butadiene was further added, and polymerization was further performed for 5 minutes. Thereafter, a 10 g of the polymer solution was sampled for measurement of molecular weight before modification, and a cyclohexane solution containing N,N-bis(triethylsilyl)aminopropyltrimethoxysilane (4.96 mmol) was added and reaction was performed for 15 minutes. To the polymer solution after the reaction, a cyclohexane solution containing 3-aminopropyltriethoxysilane (4.96 mmol) was added, and mixing of these solutions was carried out for 5 minutes. Further thereto, addition of a cyclohexane solution containing silicon tetrachloride (3.93 mmol) was carried out, followed by 5-minute mixing. Furthermore thereto, addition of a cyclohexane solution containing bis(2-ethylhexanoato)tin (4.96 mmol) was carried out, followed by 5-minute mixing. Then to the thus prepared polymer solution, 2.0 g of 2,6-di-tert-butyl-p-cresol was added. Subsequently thereto, the solvent was removed by performing steam stripping through the use of hot water adjusted to pH=9 with sodium hydroxide, and rubber thus isolated was dried with hot rolls adjusted to a temperature of 110° C. Thus, modified conjugated diene rubber A was produced.

The polymerization formula of the modified conjugated diene rubber A is shown in Table 1, and properties of the modified conjugated diene rubber A thus produced are shown in Table 2. In addition, a rubber composition was prepared using the modified conjugated diene rubber A and following a compounding formula shown in Table 3, and vulcanization was carried out to evaluate physical properties. Results thereof are shown in Table 4.

Example 2

Synthesis of Modified Conjugated Diene Rubber B, and Evaluation Thereof

Modified conjugated diene rubber B was produced in the same manner as in Example 1, except that N,N-bis(triethylsilyl)aminopropylmethyldimethoxysilane was used in place of N,N-bis(triethylsilyl)aminopropyltrimethoxysilane in Example 1.

The polymerization formula of the modified conjugated diene rubber B is shown in Table 1, and properties of the modified conjugated diene rubber B produced are shown in Table 2. Additionally, a rubber composition was prepared using the modified conjugated diene rubber B and following a compounding formula shown in Table 3, and vulcanization was carried out to evaluate physical properties. Results thereof are shown in Table 4.

Example 3

Synthesis of Modified Conjugated Diene Rubber C, and Evaluation Thereof

Modified conjugated diene rubber C was produced in the same manner as in Example 1, except that N,N-bis(trimethylsilyl)aminopropyltriethoxysilane was used in place of N,N-bis(triethylsilyl)aminopropyltrimethoxysilane in Example 1.

The polymerization formula of the modified conjugated diene rubber C is shown in Table 1, and properties of the modified conjugated diene rubber C thus produced are shown in Table 2. Additionally, a rubber composition was prepared using the modified conjugated diene rubber C and following a compounding formula shown in Table 3, and vulcanization was carried out to evaluate physical properties. Results thereof are shown in Table 4.

Example 4

Synthesis of Modified Conjugated Diene Rubber D, and Evaluation Thereof

Into a nitrogen-displaced autoclave reactor having an interior volume of 5 liter, 2,750 g of cyclohexane, 10.3 g of tetrahydrofuran, 50 g of styrene and 440 g of 1,3-butadiene were charged. The contents in the reactor were adjusted to have a temperature of 10° C., and then polymerization was initiated by addition of a cyclohexane solution containing n-butyl lithium (5.80 mmol). The polymerization was carried out under adiabatic conditions, and the maximum temperature reached to 85° C.

When the conversion rate in the polymerization reached to 99%, 10 g of butadiene was added, and polymerization was further performed for 5 minutes. Thereafter, 10 g of the polymer solution was sampled for measurement of molecular weight before modification, and a cyclohexane solution containing 1-(3-triethoxysilylpropyl)-2,2,5,5-tetramethyl-1-aza-2,5-disilacyclopentane (4.96 mmol) was added, followed by reaction for 15 minutes. To the polymer solution after the reaction, a cyclohexane solution containing 3-aminopropyltriethoxysilane (4.96 mmol) was added, and mixing of the solutions was carried out for 5 minutes. Furthermore, a cyclohexane solution containing silicon tetrachloride (3.93 mmol) was added, followed by mixing for 5 minutes. Furthermore, a cyclohexane solution containing titanium tetrakis(2-ethylhexyl oxide) (4.96 mmol) was added, followed by mixing for 5 minutes. Then, to the thus prepared polymer solution, 2.0 g of 2,6-di-tert-butyl-p-cresol was added. Subsequently, the solvent was removed by performing steam stripping through the use of hot water adjusted to pH=6 with sodium hydroxide, and rubber thus isolated was dried with hot rolls adjusted to a temperature of 110° C. Thus, modified conjugated diene rubber D was produced.

The polymerization formula of the modified conjugated diene rubber D is shown in Table 1, and properties of the modified conjugated diene rubber D produced are shown in Table 2. Additionally, a rubber composition was prepared using the modified conjugated diene rubber D and following a compounding formula shown in Table 3, and vulcanization was accired out to evelaute physical properties. Results thereof are shown in Table 4.

Example 5

Synthesis of Modified Conjugated Diene Rubber E, and Evaluation Thereof

Modified conjugated diene rubber E was produced in the same manner as in Example 1, except that N-[3-(trimethoxysilyl)-propyl]-N,N'-diethyl-N'-trimethylsilyl-ethane-1,2-diamine was used in place of N,N-bis(triethylsilyl)aminopropyltrimethoxysilane in Example 1 and the amount of silicon tetrachloride added was changed from 3.93 mmol to 5.17 mmol and zirconium tetrakis(acetylacetonate) was used in place of bis(2-ethylhexanoato)tin.

The polymerization formula of the modified conjugated diene rubber E is shown in Table 1, and properties of the modified conjugated diene rubber E produced are shown in Table 2. Additionally, a rubber composition was prepared using the modified conjugated diene rubber E and following a compounding formula shown in Table 3, and vulcanization was carried our to evaluate physical properties. Results thereof are shown in Table 4.

Example 6

Synthesis of Modified Conjugated Diene Rubber F, and Evaluation Thereof

Modified conjugated diene rubber F was produced in the same manner as in Example 5, except that 3-(4-trimethylsilyl-1-piperazino)propyltriethoxysilane was used in place of N-[3-(trimethoxysilyl)-propyl-N,N'-diethyl-N'-trimethylsilyl-ethane-1,2-diamine in Example 5.

The polymerization formula of the modified conjugated diene rubber F is shown in Table 1, and properties of the modified conjugated diene rubber F produced are shown in Table 2. Additionally, a rubber composition was prepared using the modified conjugated diene rubber F and following a compounding formula shown in Table 3, and vulcanization was carried out to evaluate physical properties. Results thereof are shown in Table 4.

Example 7

Synthesis of Modified Conjugated Diene Rubber G, and Evaluation Thereof

Modified conjugated diene rubber G was produced in the same manner as in Example 5, except that 3-(4-methyl-1-piperazino)propyltriethoxysilane was used in place of N-[3-(trimethoxysilyl)-propyl-N,N'-diethyl-N'-trimethylsilyl-ethane-1,2-diamine in Example 5.

The polymerization formula of the modified conjugated diene rubber G is shown in Table 1, and properties of the modified conjugated diene rubber G produced are shown in Table 2. Additionally, a rubber composition was prepared using the modified conjugated diene rubber G and following a compounding formula shown in Table 3, and vulcanization was accired out to evaluate physical properties. Results thereof are shown in Table 4.

Example 8

Synthesis of Modified Conjugated Diene Rubber H, and Evaluation Thereof

Modified conjugated diene rubber H was produced in the same manner as in Example 1, except that 3-diethylaminopropyltriethoxysilane was used in place of N,N-bis(triethylsilyl)aminopropyltrimethoxysilane in Example 1.

The polymerization formula of the modified conjugated diene rubber H is shown in Table 1, and properties of the modified conjugated diene rubber H thus produced are shown in Table 2. Additionally, a rubber composition was prepared using the modified conjugated diene rubber H and following a compounding formula shown in Table 3, and vulcanization was carried out to evaluate physical properties. Results thereof are shown in Table 4.

Example 9

Synthesis of Modified Conjugated Diene Rubber I, and Evaluation Thereof

Modified conjugated diene rubber I was produced in the same manner as in Example 1, except that S-trimethylsilylmercaptopropyltriethoxysilane was used in place of N,N-bis(triethylsilyl)aminopropyltrimethoxysilane in Example 1.

The polymerization formula of the modified conjugated diene rubber I is shown in Table 1, and properties of the modified conjugated diene rubber I produced are shown in Table 2. Additionally, a rubber composition was prepared using the modified conjugated diene rubber I and following a compounding formula shown in Table 3, and vulcanization was carried out to evaluate physical properties. Results thereof are shown in Table 4.

Example 10

Synthesis of Modified Conjugated Diene Rubber J, and Evaluation Thereof

Modified conjugated diene rubber J was produced in the same manner as in Example 1, except that 3-diphenylphosphinopropyltrimethoxysilane was used in place of N,N-bis(triethylsilyl)aminopropyltrimethoxysilane in Example 1.

The polymerization formula of the modified conjugated diene rubber J is shown in Table 1, and properties of the modified conjugated diene rubber J produced are shown in Table 2. Additionally, a rubber composition was prepared using the modified conjugated diene rubber J and following a compounding formula shown in Table 3, and vulcanization was carried out to evaluate physical properties. Results thereof are shown in Table 4.

Example 11

Synthesis of Modified Conjugated Diene Rubber K, and Evaluation Thereof

Modified conjugated diene rubber K was produced in the same manner as in Example 1, except that mercaptopropyltriethoxysilane was used in place of 3-aminopropyltriethoxysilane in Example 1.

The polymerization formula of the modified conjugated diene rubber K is shown in Table 1, and properties of the modified conjugated diene rubber K produced are shown in Table 2. Additionally, a rubber composition was prepared using the modified conjugated diene rubber K and following a compounding formula shown in Table 3, and vulcanization was carried out to evaluate physical properties. Results thereof are shown in Table 4.

Example 12

Synthesis of Modified Conjugated Diene Rubber L, and Evaluation Thereof

Modified conjugated diene rubber L was produced in the same manner as in Example 1, except that 3.25 mmol of 2,2-di(tetrahydrofuryl)propane was used in place of 50.0 g of tetrahydrofuran in Example 1; N-2-(aminoethyl)-3-aminopropylmethyldimethoxysilane was used in place of 3-aminopropyltriethoxysilane in Example 1; and the amount of silicon tetrachloride added was changed from 3.93 mmol in Example 1 to 5.17 mmol.

The polymerization formula of the modified conjugated diene rubber L is shown in Table 1, and properties of the modified conjugated diene rubber L produced are shown in Table 2. Additionally, a rubber composition was prepared using the modified conjugated diene rubber L and following a compounding formula shown in Table 3, and vulcanization was carried out to evaluate physical properties. Results thereof are shown in Table 4.

Example 13

Synthesis of Modified Conjugated Diene Rubber M, and Evaluation Thereof

Modified conjugated diene rubber M was produced in the same manner as in Example 1, except that 3.25 mmol of 2,2-di(tetrahydrofuryl)propane was used in place of 50.0 g of tetrahydrofuran in Example 1; the amount of 3-aminopropyltriethoxysilane added was changed from 4.96 mmol in Example 1 to 9.92 mmol; and the amount of silicon tetrachloride added was changed from 3.93 mmol in Example 1 to 5.17 mmol.

The polymerization formula of the modified conjugated diene rubber M is shown in Table 1, and properties of the modified conjugated diene rubber M produced are shown in Table 2. Additionally, a rubber composition was prepared using the modified conjugated diene rubber M and following a compounding formula shown in Table 3, and vulcanization was carried out to evaluate physical properties. Results thereof are shown in Table 4.

Example 14

Synthesis of Modified Conjugated Diene Rubber N, and Evaluation Thereof

Modified conjugated diene rubber N was produced in the same manner as in Example 1, except that 3.25 mmol of 2,2-di(tetrahydrofuryl)propane was used in place of 50.0 g of tetrahydrofuran in Example 1; 15.7 mmol of diethylaluminum chloride was used in place of 3.93 mmol of silicon tetrachloride in Example 1; and bis(2-ethylhexanoato)tin in Example 1 was changed to titanium tetrakis(2-ethylhexyl oxide).

The polymerization formula of the modified conjugated diene rubber N is shown in Table 1, and properties of the modified conjugated diene rubber N produced are shown in Table 2. Additionally, a rubber composition was prepared using the modified conjugated diene rubber N and following a compounding formula shown in Table 3, and vulcanization was carried out to evaluate physical properties. Results thereof are shown in Table 4.

Example 15

Synthesis of Modified Conjugated Diene Rubber O, and Evaluation Thereof

Modified conjugated diene rubber O was produced in the same manner as in Example 1, except that 3.25 mmol of 2,2-di(tetrahydrofuryl)propane was used in place of 50.0 g of tetrahydrofuran in Example 1; 10.48 mmol of isopropyl acid phosphate was used in place of 3.93 mmol of silicon tetrachloride in Example 1; and bis(2-ethylhexanoato)tin in Example 1 was changed to titanium tetrakis(2-ethylhexyl oxide).

The polymerization formula of the modified conjugated diene rubber O is shown in Table 1, and properties of the modified conjugated diene rubber O produced are shown in Table 2. Additionally, a rubber composition was prepared using the modified conjugated diene rubber O and following a compounding formula shown in Table 3, and vulcanization was carried out to evaluate physical properties. Results thereof are shown in Table 4.

Example 16

Synthesis of Modified Conjugated Diene Rubber P, and Evaluation Thereof

Into a nitrogen-displaced autoclave reactor having an interior volume of 5 liter, 2,750 g of cyclohexane, 100.0 g of tetrahydrofuran, 180 g of styrene and 310 g of 1,3-butadiene were charged. The contents in the reactor were adjusted to have a temperature of 20° C., and then polymerization was initiated by addition of a cyclohexane solution containing n-butyl lithium (4.60 mmol). The polymerization was carried out under adiabatic conditions, and the maximum temperature reached to 85° C.

When the conversion rate in the polymerization reached to 99%, 10 g of butadiene was further added, and polymerization was further performed for 5 minutes. Thereafter, a 10 g of the polymer solution was sampled for measurement of molecular weight before modification, and a cyclohexane solution containing N,N-bis(triethylsilyl)aminopropyltrimethoxysilane (3.93 mmol) was added, followed by reaction for 15 minutes. To the polymer solution after the reaction, a cyclohexane solution containing 3-aminopropyltriethoxysilane (3.93 mmol) was added, and mixing of the solutions was carried out for 5 minutes. Furthermore, a cyclohexane solution containing silicon tetrachloride (3.12 mmol) was added, followed by mixing for 5 minutes. Furthermore, a cyclohexane solution containing zirconium tetrakis(acetylacetonate) (4.96 mmol) was added, followed by mixing for 5 minutes. To the thus prepared polymer solution, 2.0 g of 2,6-di-tert-butyl-p-cresol was then added, followed by addition of 187.5 g of naphthene oil (SNH46, trade name, a product of SANKYO YUKA K.K.) and further mixing for 5 minutes. Subsequently thereto, the solvent was removed from the resulting polymer solution by performing steam stripping through the use of hot water adjusted to pH=9 with sodium hydroxide, and rubber thus isolated was dried with hot rolls adjusted to a temperature of 110° C. Thus, modified conjugated diene rubber P was produced.

The polymerization formula of the modified conjugated diene rubber P is shown in Table 1, and properties of the modified conjugated diene rubber P produced are shown in Table 2. Additionally, a rubber composition was prepared using the modified conjugated diene rubber P and following a compounding formula shown in Table 3, and vulcanization was carried out to evaluate physical properties. Results thereof are shown in Table 4.

Example 17

Synthesis of Modified Conjugated Diene Rubber Q, and Evaluation Thereof

Modified conjugated diene rubber Q was produced in the same manner as in Example 4, except that 1-(3-triethoxysilylpropyl)-2,2,5,5-tetramethyl-1-aza-2,5-disilacyclopentane was added first; then titanium tetrakis(2-ethylhexyl oxide) was added; next 3-aminopropyltriethoxysilane was added; and silicon tetrachloride was added last.

The polymerization formula of the modified conjugated diene rubber Q is shown in Table 1, and properties of the modified conjugated diene rubber Q produced are shown in Table 2. Additionally, a rubber composition was prepared using the modified conjugated diene rubber Q and following a compounding formula shown in Table 3, and vulcanization was carried out to evaluate physical properties. Results thereof are shown in Table 4.

Example 18

Synthesis of Modified Conjugated Diene Rubber R, and Evaluation Thereof

Modified conjugated diene rubber R was produced in the same manner as in Example 4, except that 1-(3-triethoxysilylpropyl)-2,2,5,5-tetramethyl-1-aza-2,5-disilacyclopentane was added first; then titanium tetrakis(2-ethylhexyl oxide), 3-aminopropyltriethoxysilane and silicon tetrachloride were added at the same time.

The polymerization formula of the modified conjugated diene rubber R is shown in Table 1, and properties of the modified conjugated diene rubber R produced are shown in Table 2. Additionally, a rubber composition was prepared using the modified conjugated diene rubber R and following a compounding formula shown in Table 3, and vulcanization was carried out to evaluate physical properties. Results thereof are shown in Table 4.

Comparative Example 1

Synthesis of Modified Conjugated Diene Rubber S, and Evaluation Thereof

Modified conjugated diene rubber S was produced in the same manner as in Example 1, except that N,N-bis(triethylsilyl)aminopropyltrimethoxysilane in Example 1 was not added.

The polymerization formula of the modified conjugated diene rubber S is shown in Table 1, and properties of the modified conjugated diene rubber S produced are shown in Table 2. Additionally, a rubber composition was prepared using the modified conjugated diene rubber S and following a compounding formula shown in Table 3, and vulcanization was carried out to evaluate physical properties. Results thereof are shown in Table 4.

Comparative Example 2

Synthesis of Modified Conjugated Diene Rubber T, and Evaluation Thereof

Modified conjugated diene rubber T was produced in the same manner as in Example 1, except that 3-aminopropyltriethoxysilane in Example 1 was not added.

The polymerization formula of the modified conjugated diene rubber T is shown in Table 1, and properties of the modified conjugated diene rubber T produced are shown in Table 2. Additionally, a rubber composition was prepared using the modified conjugated diene rubber T and following a compounding formula shown in Table 3, and vulcanization was carried out to evaluate physical properties. Results thereof are shown in Table 4.

Comparative Example 3

Synthesis of Modified Conjugated Diene Rubber U, and Evaluation Thereof

Modified conjugated diene rubber U was produced in the same manner as in Example 1, except that silicon tetrachloride in Example 1 was not added.

The polymerization formula of the modified conjugated diene rubber U is shown in Table 1, and properties of the modified conjugated diene rubber U produced are shown in Table 2. Additionally, a rubber composition was prepared using the modified conjugated diene rubber U and following a compounding formula shown in Table 3, and vulcanization was carried out to evaluate physical properties. Results thereof are shown in Table 4.

Comparative Example 4

Synthesis of Modified Conjugated Diene Rubber V, and Evaluation Thereof

Modified conjugated diene rubber V was produced in the same manner as in Example 1, except that bis(2-ethylhexanoato)tin in Example 1 was not added.

The polymerization formula of the modified conjugated diene rubber V is shown in Table 1, and properties of the modified conjugated diene rubber V produced are shown in Table 2. Additionally, a rubber composition was prepared using the modified conjugated diene rubber V and following a compounding formula shown in Table 3, and vulcanization was carried out to evaluate physical properties. Results thereof are shown in Table 4.

Comparative Example 5

Synthesis of Modified Conjugated Diene Rubber W, and Evaluation Thereof

Modified conjugated diene rubber W was produced in the same manner as in Example 16, except that 3-aminopropyltriethoxysilane in Example 16 was not added.

The polymerization formula of the modified conjugated diene rubber W is shown in Table 1, and properties of the modified conjugated diene rubber W produced are shown in Table 2. Additionally, a rubber composition was prepared using the modified conjugated diene rubber W and following a compounding formula shown in Table 3, and vulcanization was carried out to evaluate physical properties. Results thereof are shown in Table 4.

Comparative Example 6

Synthesis of Modified Conjugated Diene Rubber X, and Evaluation Thereof

Modified conjugated diene rubber X was produced in the same manner as in Example 1, except that tetraethoxysilane was used in place of N,N-bis(triethylsilyl)aminopropyltrimethoxysilane in Example 1.

The polymerization formula of the modified conjugated diene rubber X is shown in Table 1, and properties of the modified conjugated diene rubber X thus produced are shown in Table 2. Additionally, a rubber composition was prepared using the modified conjugated diene rubber X and following a compounding formula shown in Table 3, and vulcanization was carried out to evaluate physical properties. Results thereof are shown in Table 4.

[Kneading Method of Rubber Composition, and Characteristic Evaluation]

As first-step kneading, the modified conjugated diene rubber produced in each of Examples and Comparative Examples was kneaded with butadiene rubber, natural rubber, extension oil, carbon black, silica, a silane coupling agent, stearic acid, an anti-aging agent and zinc oxide by using a plastomill (an interior volume: 250 cc) with a temperature control device on conditions that the filling rate is 72% and the number of revolutions is 60 rpm. And then, as second-step kneading, the compounded matter prepared was cooled to room temperature, and kneaded with sulfur and a vulcanization accelerator in accordance with a compounding formula shown in Tables 3 and 4. The kneaded matter thus prepared was subjected to molding, and vulcanized at 160° C. for a determined time by means of a vulcanizing press. Characteristic evaluations for the following tire performance were carried out.

(i) Mooney viscosity: Each of the rubber compositions before vulcanization was chosen as a measurement sample, and thereon the measurement according to JIS K6300 was made by using an L-rotor on conditions that the preheating was carried out for 1 minute; the running time of the rotor is 4 minutes; and the temperature is 100° C.

(ii) Tensile strength: In conformity with JIS K6301, a 300% modulus was measured. The greater the index value, the greater and the more satisfactory the tensile strength.

(iii) 0° C. tanδ: Vulcanized rubber was used as a measurement sample, and measurement at 0° C. was carried out by using a dynamic spectrometer (made by US Rheometric Inc.) on conditions that the tensile dynamic distortion is 0.14%; the angular velocity is 100 radians per second; and the temperature is 0° C. It was expressed as an index, and the greater the numerical value thereof, the greater and the more satisfactory the wet skid resistance.

(iv) 70° C. tanδ: Vulcanized rubber was used as a measurement sample, measurement at 70° C. was carried out by using a dynamic spectrometer (made by US Rheometric Inc.) on conditions that the tensile dynamic distortion is 0.7%; the angular velocity is 100 radians per second; and the temperature is 70° C. It was expressed as an index, and the greater the numerical value thereof, the lesser and the more satisfactory the low hysteresis-loss property.

(v) Abrasion resistance: Vulcanized rubber was used as a measurement sample, and abrasion resistance thereof was determined by using a DIN abrasion tester (made by Toyo Seiki Co., Ltd.) under a load of 10N at 25° C. in conformity with JIS K 6264. The abrasion resistance was expressed as an index, and the greater the index value, the more satisfactory the abrasion resistance.

TABLE 1

| | | Examples | | | | | | | | |
|---|---|---|---|---|---|---|---|---|---|---|
| | | 1 | 2 | 3 | 4 | 5 | 6 | 7 | 8 | 9 |
| Varieties of modified conjugated diene rubber Polymerization Formula Solvent: | | A | B | C | D | E | F | G | H | I |
| Cyclohexane Agent for Adjusting Vinyl Content: | (g) | 2750.00 | 2750 | 2750 | 2750 | 2750 | 2750 | 2750 | 2750 | 2750 |
| Tetrahydrofuran | (g) | 50.0 | 50.0 | 50.0 | 10.3 | 50.0 | 50.0 | 50.0 | 50.0 | 50.0 |
| 2,2-Di(tetrahydrofuryl)propane | (mmol) | — | — | — | — | — | — | — | — | — |

TABLE 1-continued

| Polymerizing monomer: | | | | | | | | | | |
|---|---|---|---|---|---|---|---|---|---|---|
| Styrene | (g) | 125 | 125 | 125 | 50 | 125 | 125 | 125 | 125 | 125 |
| Butadiene | (g) | 365 | 365 | 365 | 440 | 365 | 365 | 365 | 365 | 365 |
| Additional butadiene | (g) | 10 | 10 | 10 | 10 | 10 | 10 | 10 | 10 | 10 |
| Polymerization initiator: | | | | | | | | | | |
| n-Butyl lithium | (mmol) | 5.80 | 5.80 | 5.80 | 5.80 | 5.80 | 5.80 | 5.80 | 5.80 | 5.80 |
| First alkoxysilane compound: | | | | | | | | | | |
| N—Si-1 *1 | (mmol) | 4.96 | — | — | — | — | — | — | — | — |
| N—Si-2 *2 | (mmol) | — | 4.96 | — | — | — | — | — | — | — |
| N—Si-3 *3 | (mmol) | — | — | 4.96 | — | — | — | — | — | — |
| N—Si-4 *4 | (mmol) | — | — | — | 4.96 | — | — | — | — | — |
| N—Si-5 *5 | (mmol) | — | — | — | — | 4.96 | — | — | — | — |
| N—Si-6 *6 | (mmol) | — | — | — | — | — | 4.96 | — | — | — |
| N—Si-7 *7 | (mmol) | — | — | — | — | — | — | 4.96 | — | — |
| N—Si-8 *8 | (mmol) | — | — | — | — | — | — | — | 4.96 | — |
| S—Si-1 *9 | (mmol) | — | — | — | — | — | — | — | — | 4.96 |
| P—Si-1 *10 | (mmol) | — | — | — | — | — | — | — | — | — |
| Si-1 *11 | (mmol) | — | — | — | — | — | — | — | — | — |
| Second alkoxysilane compound: | | | | | | | | | | |
| N-1 *12 | (mmol) | 4.96 | 4.96 | 4.96 | 4.96 | 4.96 | 4.96 | 4.96 | 4.96 | 4.96 |
| N-2 *13 | (mmol) | — | — | — | — | — | — | — | — | — |
| S-1 *14 | (mmol) | — | — | — | — | — | — | — | — | — |
| Agent for producing onium: | | | | | | | | | | |
| Cl-1 *15 | (mmol) | 3.93 | 3.93 | 3.93 | 3.93 | 5.17 | 5.17 | 5.17 | 3.93 | 3.93 |
| Cl-2 *16 | (mmol) | — | — | — | — | — | — | — | — | — |
| P-1 *17 | (mmol) | — | — | — | — | — | — | — | — | — |
| Condensation catalyst: | | | | | | | | | | |
| Sn-1 *18 | (mmol) | 4.96 | 4.96 | 4.96 | — | — | — | — | 4.96 | 4.96 |
| Zr-1 *19 | (mmol) | — | — | — | — | 4.96 | 4.96 | 4.96 | — | — |
| Ti-1 *20 | (mmol) | — | — | — | 4.96 | — | — | — | — | — |
| Extension oil: | | | | | | | | | | |
| Oil *21 | (g) | — | — | — | — | — | — | — | — | — |

| | | Examples | | | | | | | | |
|---|---|---|---|---|---|---|---|---|---|---|
| | | 10 | 11 | 12 | 13 | 14 | 15 | 16 | 17 | 18 |
| Varieties of modified conjugated diene rubber | | J | K | L | M | N | O | P | Q | R |
| Polymerization Formula Solvent: | | | | | | | | | | |
| Cyclohexane | (g) | 2750 | 2750 | 2750 | 2750 | 2750 | 2750 | 2750 | 2750 | 2750 |
| Agent for Adjusting Vinyl Content: | | | | | | | | | | |
| Tetrahydrofuran | (g) | 50.0 | 50.0 | — | — | — | — | 100 | 10.3 | 10.3 |
| 2,2-Di(tetrahydrofuryl)propane | (mmol) | — | — | 3.25 | 3.25 | 3.25 | 3.25 | — | — | — |
| Polymerizing monomer: | | | | | | | | | | |
| Styrene | (g) | 125 | 125 | 125 | 125 | 125 | 125 | 180 | 50 | 50 |
| Butadiene | (g) | 365 | 365 | 365 | 365 | 365 | 365 | 310 | 440 | 440 |
| Additional butadiene | (g) | 10 | 10 | 10 | 10 | 10 | 10 | 10 | 10 | 10 |
| Polymerization initiator: | | | | | | | | | | |
| n-Butyl lithium | (mmol) | 5.80 | 5.80 | 5.80 | 5.80 | 5.80 | 5.80 | 4.60 | 5.80 | 5.80 |
| First alkoxysilane compound: | | | | | | | | | | |
| N—Si-1 *1 | (mmol) | — | 4.96 | 4.96 | 4.96 | 4.96 | 4.96 | 3.93 | — | — |
| N—Si-2 *2 | (mmol) | — | — | — | — | — | — | — | — | — |
| N—Si-3 *3 | (mmol) | — | — | — | — | — | — | — | — | — |
| N—Si-4 *4 | (mmol) | — | — | — | — | — | — | — | 4.96 | 4.96 |
| N—Si-5 *5 | (mmol) | — | — | — | — | — | — | — | — | — |
| N—Si-6 *6 | (mmol) | — | — | — | — | — | — | — | — | — |
| N—Si-7 *7 | (mmol) | — | — | — | — | — | — | — | — | — |
| N—Si-8 *8 | (mmol) | — | — | — | — | — | — | — | — | — |

TABLE 1-continued

| | | | | | | | | | | |
|---|---|---|---|---|---|---|---|---|---|---|
| S—Si-1 *9 | (mmol) | — | — | — | — | — | — | — | — | — |
| P—Si-1 *10 | (mmol) | 4.96 | — | — | — | — | — | — | — | — |
| Si-1 *11 | (mmol) | — | — | — | — | — | — | — | — | — |
| Second alkoxysilane compound: | | | | | | | | | | |
| N-1 *12 | (mmol) | 4.96 | — | — | 9.92 | 4.96 | 4.96 | 3.93 | 4.96 | 4.96 |
| N-2 *13 | (mmol) | — | — | 4.96 | — | — | — | — | — | — |
| S-1 *14 | (mmol) | — | 4.96 | — | — | — | — | — | — | — |
| Agent for producing onium: | | | | | | | | | | |
| Cl-1 *15 | (mmol) | 3.93 | 3.93 | 5.17 | 5.17 | — | — | 3.12 | 3.93 | 3.93 |
| Cl-2 *16 | (mmol) | — | — | — | — | 15.7 | — | — | — | — |
| P-1 *17 | (mmol) | — | — | — | — | — | 10.48 | — | — | — |
| Condensation catalyst: | | | | | | | | | | |
| Sn-1 *18 | (mmol) | 4.96 | 4.96 | 4.96 | 4.96 | — | — | — | — | — |
| Zr-1 *19 | (mmol) | — | — | — | — | — | — | 4.96 | — | — |
| Ti-1 *20 | (mmol) | — | — | — | — | 4.96 | 4.96 | — | 4.96 | 4.96 |
| Extension oil: | | | | | | | | | | |
| Oil *21 | (g) | — | — | — | — | — | — | 187.5 | — | — |

| | | Comparative Examples | | | | | |
|---|---|---|---|---|---|---|---|
| | | 1 | 2 | 3 | 4 | 5 | 6 |
| Varieties of modified conjugated diene rubber | | S | T | U | V | W | X |
| Polymerization Formula | | | | | | | |
| Solvent: | | | | | | | |
| Cyclohexane | (g) | 2750 | 2750 | 2750 | 2750 | 2750 | 2750 |
| Agent for Adjusting Vinyl Content: | | 50.0 | 50.0 | 50.0 | 50.0 | 100 | 50.0 |
| Tetrahydrofuran | (g) | — | — | — | — | — | — |
| 2,2-Di(tetrahydro-furyl)propane (mmol) | | | | | | | |
| Polymerizing monomer: | | | | | | | |
| Styrene | (g) | 125 | 125 | 125 | 125 | 180 | 125 |
| Butadiene | (g) | 365 | 365 | 365 | 365 | 310 | 365 |
| Additional butadiene | (g) | 10 | 10 | 10 | 10 | 10 | 10 |
| Polymerization initiator: | | | | | | | |
| n-Butyl lithium | (mmol) | 5.80 | 5.80 | 5.80 | 5.80 | 4.60 | 5.80 |
| First alkoxysilane compound: | | | | | | | |
| N—Si-1 *1 | (mmol) | — | 4.96 | 4.96 | 4.96 | 3.93 | — |
| N—Si-2 *2 | (mmol) | — | — | — | — | — | — |
| N—Si-3 *3 | (mmol) | — | — | — | — | — | — |
| N—Si-4 *4 | (mmol) | — | — | — | — | — | — |
| N—Si-5 *5 | (mmol) | — | — | — | — | — | — |
| N—Si-6 *6 | (mmol) | — | — | — | — | — | — |
| N—Si-7 *7 | (mmol) | — | — | — | — | — | — |
| N—Si-8 *8 | (mmol) | — | — | — | — | — | — |
| S—Si-1 *9 | (mmol) | — | — | — | — | — | — |
| P—Si-1 *10 | (mmol) | — | — | — | — | — | — |
| Si-1 *11 | (mmol) | — | — | — | — | — | 4.96 |
| Second alkoxysilane compound: | | | | | | | |
| N-1 *12 | (mmol) | 4.96 | — | 4.96 | 4.96 | — | 4.96 |
| N-2 *13 | (mmol) | — | — | — | — | — | — |
| S-1 *14 | (mmol) | — | — | — | — | — | — |
| Agent for producing onium: | | | | | | | |
| Cl-1 *15 | (mmol) | 3.93 | 3.93 | — | 3.93 | 3.12 | 3.93 |
| Cl-2 *16 | (mmol) | — | — | — | — | — | — |
| P-1 *17 | (mmol) | — | — | — | — | — | — |

TABLE 1-continued

|  |  |  |  |  |  |  |  |
|---|---|---|---|---|---|---|---|
| Condensation catalyst: |  |  |  |  |  |  |  |
| Sn-1 *18 | (mmol) | 4.96 | 4.96 | 4.96 | — | — | 4.96 |
| Zr-1 *19 | (mmol) | — | — | — | — | 4.96 | — |
| Ti-1 *20 | (mmol) | — | — | — | — | — | — |
| Extension oil: |  |  |  |  |  |  |  |
| Oil *21 | (g) | — | — | — | — | 187.5 | — |

*1: N,N-Bis(triethylsilyl)aminopropyltrimethoxysilane
*2: N,N-Bis(triethylsilyl)aminopropylmethyldimethoxysilane
*3: N,N,-Bis(triethylsilyl)aminopropyltriethoxysilane
*4: 1-(3-Triethoxysilylpropyl)-2,2,5,5-tetramethyl-1-aza-2,5-disilacyclopentane
*5: N-[3-(Trimethoxysilyl)-propyl]-N,N'-diethyl-N'-trimethylsilyl-ethane-1,2-diamine
*6: 3-(4-Trimethylsilyl-1-piperazino)propyltriethoxysilane
*7: 3-(4-Methyl-1-piperazino)propyltriethoxysilane
*8: 3-Diethylaminopropyltriethoxysilane
*9: S-Trimethylsilylmercaptopropyltriethoxysilane
*10: 3-Diphenylphosphinopropyltrimethoxysilane
*11: Tetraethoxysilane
*12: 3-Aminopropyltriethoxysilane
*13: N-2-(aminoethyl)-3-aminopropylmethyldimethoxysilane
*14: Mercaptopropyltriethoxysilane
*15: Silicon tetrachloride
*16: Diethylaluminum chloride
*17: Isopropyl acid phosphate
*18: Bis(2-ethylhexanoato)tin
*19: Zirconium tetrakis(acetylacetonate)
*20: Titanium tetrakis(2-ethylhexyl oxide)
*21: Naphthene oil (PCA content lower than 3%)

TABLE 2

|  | Examples |  |  |  |  |  |  |  |  |  |  |  |
|---|---|---|---|---|---|---|---|---|---|---|---|---|
|  | 1 | 2 | 3 | 4 | 5 | 6 | 7 | 8 | 9 | 10 | 11 | 12 |
| Varieties of modified conjugated diene rubber [Characteristics of modified conjugated diene rubber] | A | B | C | D | E | F | G | H | I | J | K | L |
| Bonded styrene content (mass %) | 25 | 25 | 25 | 10 | 25 | 25 | 25 | 25 | 25 | 25 | 25 | 25 |
| Vinyl content (%) | 55 | 55 | 56 | 41 | 55 | 55 | 56 | 55 | 55 | 54 | 56 | 56 |
| Glass transition temperature (° C.) | −30 | −31 | −31 | −60 | −30 | −30 | −30 | −31 | −30 | −31 | −31 | −33 |
| Weight-average Molecular weight before modification ($\times 10^4$) | 19 | 20 | 19 | 20 | 18 | 19 | 20 | 19 | 20 | 20 | 19 | 20 |
| Mooney viscosity (ML 1 + 4, 100° C.) | 85 | 63 | 78 | 75 | 82 | 75 | 73 | 70 | 81 | 66 | 101 | 92 |
| Cold flow value (mg/min) | 0.1 | 0.2 | 0.1 | 0.1 | 0.1 | 0.1 | 0.1 | 0.1 | 0.1 | 0.2 | 0 | 0 |

|  | Examples |  |  |  |  |  | Comparative Examples |  |  |  |  |  |
|---|---|---|---|---|---|---|---|---|---|---|---|---|
|  | 13 | 14 | 15 | 16 | 17 | 18 | 1 | 2 | 3 | 4 | 5 | 6 |
| Varieties of modified conjugated diene rubber [Characteristics of modified conjugated diene rubber] | M | N | O | P | Q | R | S | T | U | V | W | X |
| Bonded styrene content (mass %) | 25 | 25 | 25 | 36 | 10 | 10 | 25 | 25 | 25 | 25 | 36 | 25 |
| Vinyl content (%) | 55 | 56 | 56 | 62 | 41 | 40 | 56 | 56 | 55 | 56 | 63 | 55 |
| Glass transition temperature (° C.) | −32 | −32 | −32 | −14 | −61 | −60 | −31 | −30 | −30 | −31 | −13 | −31 |

TABLE 2-continued

| | | | | | | | | | | | | |
|---|---|---|---|---|---|---|---|---|---|---|---|---|
| Weight-average Molecular weight before modification (×10⁴) | 20 | 20 | 20 | 27 | 19 | 19 | 20 | 19 | 20 | 20 | 28 | 20 |
| Mooney viscosity (ML 1 + 4, 100° C.) | 94 | 78 | 87 | 67 | 73 | 74 | 11 | 64 | 53 | 67 | 58 | 76 |
| Cold flow value (mg/min) | 0 | 0.1 | 0.1 | 0.1 | 0.1 | 0.1 | ≥10 | 0.2 | 0.4 | 0.2 | 0.4 | 0.1 |

TABLE 3

| Compounding Formula (phr) | I | II |
|---|---|---|
| Modified conjugated diene rubber | 70 | 96.25 |
| Butadiene rubber *1) | — | 30 |
| Natural rubber | 30 | — |
| Extension oil *2) | 37.5 | 11.25 |
| Carbon black *3) | 5.6 | 5.6 |
| Silica *4) | 80 | 80 |
| Silane coupling agent *5) | 5.6 | 5.6 |
| Stearic acid | 2.0 | 2.0 |
| Anti-aging agent *6) | 1.0 | 1.0 |
| Zinc oxide | 3.0 | 3.0 |
| Vulcanization accelerator CZ *7) | 1.8 | 1.8 |
| Vulcanization accelerator D *8) | 1.5 | 1.5 |
| Sulfur | 1.5 | 1.5 |

*1) BR01, a product of JSR Corporation
*2) SNH46, a product of Sankyo Yuka Kogyo K.K.
*3) DIABLACK N339, a product of Mitsubishi Chemical Corporation
*4) Nipsill AQ, a product of Tosoh Silica Corporation
*5) Si69, a product of Evonik Industries AG
*6) NOCRAC 810NA, a product of Ouchi Shinko Chemical Industrial Co., Ltd.
*7) NOCCELER CZ, a product of Ouchi Shinko Chemical Industrial Co., Ltd.
*8) NOCCELER D, a product of Ouchi Shinko Chemical Industrial Co., Ltd.

TABLE 4

| | Examples | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| Varieties of modified conjugated diene rubber [Physical Properties of Cross-linked Rubber Composition] | A | B | C | D | E | F | G | H | I | J | K | L |
| Compounding Formula | I | I | I | I | I | I | I | I | I | I | I | I |
| Mooney Viscosity (ML 1 + 4, 100° C.) | 81 | 78 | 79 | 77 | 73 | 70 | 69 | 66 | 85 | 71 | 95 | 83 |
| Tensile Strength (index) | 108 | 106 | 105 | 104 | 107 | 108 | 103 | 104 | 109 | 104 | 108 | 106 |
| 0° C. tanδ (index) | 138 | 141 | 136 | 128 | 130 | 129 | 129 | 131 | 133 | 132 | 135 | 132 |
| 70° C. tanδ (index) | 135 | 138 | 136 | 145 | 131 | 130 | 132 | 130 | 129 | 131 | 136 | 136 |
| Abrasion Resistance (index) | 114 | 117 | 115 | 125 | 115 | 114 | 113 | 113 | 111 | 116 | 114 | 113 |

| | Examples | | | | | | Comparative Examples | | | | | |
|---|---|---|---|---|---|---|---|---|---|---|---|---|
| | 13 | 14 | 15 | 16 | 17 | 18 | 1 | 2 | 3 | 4 | 5 | 6 |
| Varieties of modified conjugated diene rubber [Physical Properties of Cross-linked Rubber Composition] | M | N | O | P | Q | R | S | T | U | V | W | X |
| Compounding Formula | I | I | I | II | I | I | I | I | I | I | II | I |
| Mooney Viscosity (ML 1 + 4, 100° C.) | 84 | 75 | 77 | 108 | 79 | 74 | 51 | 63 | 58 | 75 | 95 | 64 |
| Tensile Strength (index) | 109 | 103 | 104 | 114 | 106 | 105 | 100 | 105 | 103 | 107 | 110 | 104 |
| 0° C. tanδ (index) | 139 | 133 | 132 | 142 | 129 | 130 | 100 | 117 | 118 | 125 | 125 | 105 |
| 70° C. tanδ (index) | 138 | 132 | 136 | 129 | 144 | 143 | 100 | 118 | 115 | 127 | 115 | 104 |

TABLE 4-continued

| | | | | | | | | | | | | |
|---|---|---|---|---|---|---|---|---|---|---|---|---|
| Abrasion Resistance (index) | 116 | 113 | 115 | 118 | 124 | 126 | 100 | 106 | 103 | 107 | 110 | 103 |

As is evident from Table 4, the present compositions (Examples 1 to 18) using the present modified conjugated diene rubber have achieved marked improvement in balance between wet skid resistance and a low hysteresis-loss property without impairments of tensile strength and abrasion resistance.

From the physical-property evaluation results of the modified conjugated diene rubber S to the modified conjugated diene rubber W produced in Comparative Examples 1 to 5, respectively, it can be confirmed that all the present steps (a) through (b) are of importance to improvement in balance between wet skid resistance and a low hysteresis-loss property.

From the physical-property evaluation result of the modified conjugated diene rubber X produced in Comparative Example 6, it can be confirmed that the modification by an alkoxysilane compound having a group convertible into an onium is of importance to improvements in tensile strength, abrasion resistance and balance between wet skid resistance and a low hysteresis-loss property.

The invention claimed is:

1. A method of producing a modified conjugated diene rubber, the method comprising:
    mixing i) a modified conjugated diene polymer comprising a group convertible into an onium and an alkoxysilyl group, ii) an agent that produces onium, iii) a second alkoxysilane compound comprising an alkoxysilyl group and a group which is convertible into an onium with the agent per molecule, and iv) a condensation catalyst comprising a metal element for alkoxysilane compounds, to obtain a mixture.

2. The method of claim 1, wherein the modified conjugated diene polymer is produced by reacting:
    a conjugated diene polymer comprising an alkali metal or alkaline-earth metal active terminal, which is a polymer produced by polymerizing a conjugated diene compound or a conjugated diene compound with an aromatic vinyl compound; and
    a first alkoxysilane compound comprising both of an alkoxysilyl group comprising two or more alkoxy groups and a group which is convertible into an onium with the agent per molecule.

3. The method of claim 2, wherein the group convertible into an onium in the first alkoxysilane compound is at least one group selected from the group consisting of a nitrogen-comprising group formed by substituting two protective groups for two hydrogen atoms of a primary amine, a nitrogen-comprising group formed by substituting one protective group for one hydrogen atom of a secondary amine, a tertiary amino group, an imino group, a pyridyl group, a phosphorus-comprising group formed by substituting two protective groups for two hydrogen atoms of a primary phosphine, a phosphorus-comprising group formed by substituting one protective group for one hydrogen atom of a secondary phosphine, a tertiary phosphino group and a sulfur-comprising group formed by substituting one protective group for one hydrogen atom of a thiol.

4. The method of claim 1, wherein the agent is at least one compound selected from the group consisting of a silicon halide compound, a tin halide compound, an aluminum halide compound, a titanium halide compound, zirconium halide compound, a germanium halide compound, a gallium halide compound, a zinc halide compound, a sulfuric ester, a phosphoric ester, a carboxylic acid, and a sulfonic acid.

5. The method of claim 1, wherein the group convertible into an onium in the second alkoxysilane compound is at least one group selected from the group consisting of a primary amino group, a secondary amino group, a tertiary amino group, an imino group, a pyridyl group, a primary phosphino group, a secondary phosphino group, a tertiary phosphino group, and a thiol group.

6. The method of claim 1, wherein the condensation catalyst is a metallic compound comprising at least one metal element selected from group 4, group 12, group 13, group 14, and group 15 of the periodic table.

7. The method of claim 6, wherein the metallic compound is an alkoxide, carboxylate, or acetylacetonate complex salt of the metal element.

8. The method of claim 1, further comprising:
    contacting the mixture with water.

9. The method of claim 1, wherein the modified conjugated diene rubber comprises:
    (i) the modified conjugated diene polymer;
    (ii) the second alkoxysilane compound;
    (iii) a hydrolytic condensation product of the modified conjugated diene polymer and the second alkoxysilane compound;
    (iv) a hydrolytic condensation product of the modified conjugated diene polymer and the condensation catalyst;
    (v) a hydrolytic condensation product of the second alkoxysilane compound and the condensation catalyst; and
    (vi) a hydrolytic condensation product of the modified conjugated diene polymer, the second alkoxysilane compound, and the condensation catalyst, and
    wherein the modified conjugated diene rubber has onium structures formed from substances (i) to (vi).

10. The method of claim 2, wherein the agent is at least one compound selected from the group consisting of a silicon halide compound, a tin halide compound, an aluminum halide compound, a titanium halide compound, zirconium halide compound, a germanium halide compound, a gallium halide compound, a zinc halide compound, a sulfuric ester, a phosphoric ester, a carboxylic acid, and a sulfonic acid.

11. The method of claim 2, wherein the group convertible into an onium in the second alkoxysilane compound is at least one group selected from the group consisting of a primary amino group, a secondary amino group, a tertiary amino group, an imino group, a pyridyl group, a primary phosphino group, a secondary phosphino group, a tertiary phosphino group, and a thiol group.

12. The method of claim 2, wherein the condensation catalyst is a metallic compound comprising at least one metal element selected from group 4, group 12, group 13, group 14, and group 15 of the periodic table.

13. The method of claim 12, wherein the metallic compound is an alkoxide, carboxylate, or acetylacetonate complex salt of the metal element.

14. The method of claim 2, further comprising:
    contacting the mixture with water.

15. The method of claim 2, wherein the modified conjugated diene rubber comprises:
- (i) the modified conjugated diene polymer;
- (ii) the second alkoxysilane compound;
- (iii) a hydrolytic condensation product of the modified conjugated diene polymer and the second alkoxysilane compound;
- (iv) a hydrolytic condensation product of the modified conjugated diene polymer and the condensation catalyst;
- (v) a hydrolytic condensation product of the second alkoxysilane compound and the condensation catalyst; and
- (vi) a hydrolytic condensation product of the modified conjugated diene polymer, the second alkoxysilane compound, and the condensation catalyst, and wherein the modified conjugated diene rubber has onium structures formed from substances (i) to (vi).

* * * * *